(12) United States Patent
Kraegeloh et al.

(10) Patent No.: US 9,656,814 B2
(45) Date of Patent: May 23, 2017

(54) TRANSPORT OF AN OBJECT ACROSS A SURFACE

(71) Applicant: Fraunhofer-Gesellschaft zur Foerderung der angewandten Forschung e.V., Munich (DE)

(72) Inventors: Stefan Kraegeloh, Erlangen (DE); Harald Popp, Tuchenbach (DE); Josef Bernhard, Nabburg (DE); Harald Fuchs, Roettenbach (DE); Marc Gayer, Erlangen (DE); Manfred Lutzky, Nuremberg (DE); Thomas Sporer, Fuerth (DE); Sandra Brix, Ilmenau (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 271 days.

(21) Appl. No.: 14/282,103

(22) Filed: May 20, 2014

(65) Prior Publication Data
US 2014/0257557 A1 Sep. 11, 2014

Related U.S. Application Data

(60) Division of application No. 13/103,226, filed on May 9, 2011, now Pat. No. 9,114,940, which is a (Continued)

(30) Foreign Application Priority Data

Nov. 14, 2008 (DE) .......................... 10 2008 057 389

(51) Int. Cl.
*A63F 9/00* (2006.01)
*B65G 51/03* (2006.01)
(Continued)

(52) U.S. Cl.
CPC ............. *B65G 51/03* (2013.01); *A63F 3/00* (2013.01); *A63F 3/00697* (2013.01); *A63F 3/02* (2013.01);
(Continued)

(58) Field of Classification Search
None
See application file for complete search history.

(56) References Cited

U.S. PATENT DOCUMENTS 3,841,636 A 10/1974 Meyer
3,909,741 A 9/1975 Harris
(Continued)

FOREIGN PATENT DOCUMENTS

DE 10 2006 009 451 A1 9/2007
EP 1 484 269 A1 12/2004
(Continued)

OTHER PUBLICATIONS

Official Communication issued in corresponding Japanese Patent Application No. 2013-240093, mailed on Mar. 31, 2015.
(Continued)

*Primary Examiner* — Seng H Lim
(74) *Attorney, Agent, or Firm* — Keating & Bennett, LLP

(57) ABSTRACT

A basic idea of the present application is that in case of determining a position of the object on the surface, it is possible to also use transport mechanisms for the transport of the object on the surface which leads to less reproducible transport movements as the regulation may be executed directly on the basis of the observed movement as compared to the desired movement. Embodiments using compressed air, magnetism and/or bending waves are described.

7 Claims, 20 Drawing Sheets

Related U.S. Application Data continuation of application No. PCT/EP2009/007797, filed on Oct. 30, 2009.

(51) Int. Cl.
*A63F 3/00* (2006.01)
*A63F 3/02* (2006.01)
*A63H 18/00* (2006.01)
*A63F 7/36* (2006.01)

(52) U.S. Cl.
CPC .......... *A63H 18/002* (2013.01); *A63F 7/3603* (2013.01); *A63F 2009/0087* (2013.01)

(56) References Cited

U.S. PATENT DOCUMENTS

| | | | |
|---|---|---|---|
| 4,347,022 A * | 8/1982 | Lenhart | B65G 51/02 406/88 |
| 4,874,273 A * | 10/1989 | Tokisue | H01L 21/67784 406/19 |
| 5,687,766 A * | 11/1997 | Weakley | B08B 3/022 137/810 |
| 5,800,118 A * | 9/1998 | Kurome | B65G 51/03 198/397.01 |
| 5,931,465 A * | 8/1999 | Miyake | A63F 7/3603 273/108.1 |
| 6,045,319 A * | 4/2000 | Uchida | B65G 54/02 112/DIG. 2 |
| 7,036,653 B2 | 5/2006 | Reznik et al. | |
| 8,123,225 B2 * | 2/2012 | McLaughlin | A63F 3/00176 273/236 |
| 2002/0066997 A1 | 6/2002 | Noolandi et al. | |
| 2002/0069785 A1 * | 6/2002 | Knapp | B65G 51/03 104/23.2 |
| 2006/0054774 A1 * | 3/2006 | Yassour | B65G 51/03 248/631 |
| 2006/0064199 A1 | 3/2006 | Zimmermann et al. | |
| 2007/0181735 A1 * | 8/2007 | Fedorov | B65G 51/03 242/541.7 |
| 2008/0031696 A1 * | 2/2008 | Toda | B65G 47/24 406/12 |
| 2008/0252171 A1 | 10/2008 | Kirigaya et al. | |

FOREIGN PATENT DOCUMENTS

| | | |
|---|---|---|
| GB | 1 381 326 A | 1/1975 |
| JP | 6-276619 A | 9/1994 |
| JP | 7-171267 A | 7/1995 |
| JP | 9-202425 A | 8/1997 |
| JP | 2002-177635 A | 6/2002 |
| JP | 2003-33565 A | 2/2003 |
| JP | 2008-246112 A | 10/2008 |
| RU | 2 280 487 C2 | 7/2006 |
| RU | 117 823 U1 | 7/2012 |
| WO | 2004/076320 A1 | 9/2004 |

OTHER PUBLICATIONS

Official Communication issued in corresponding Japanese Patent Application No. 2013-240095, mailed on Mar. 31, 2015.
Kraegeloh et al., "Transport of an Object Across a Surface", U.S. Appl. No. 13/103,226, filed May 9, 2011.
Official Communication issued in corresponding Japanese Patent Application No. 2013-240093, mailed on Nov. 9, 2015.

* cited by examiner

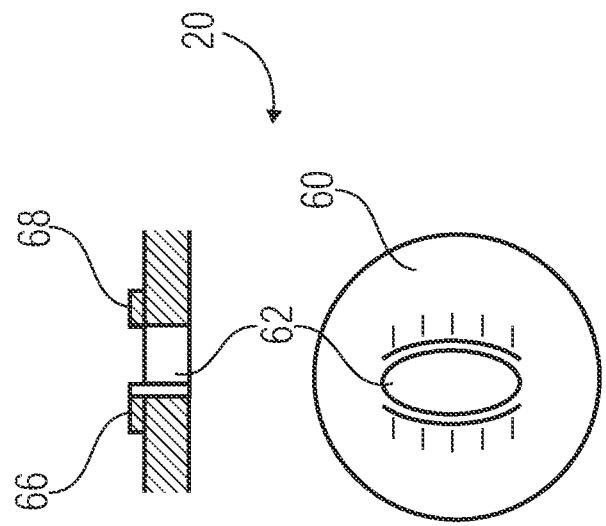
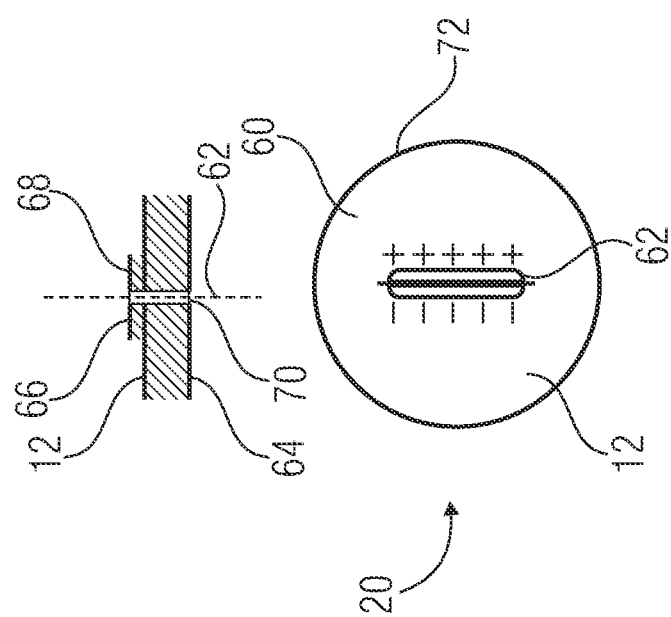
FIGURE 5B
FIGURE 5A

TRANSPORT OF AN OBJECT ACROSS A SURFACE

CROSS-REFERENCE TO RELATED APPLICATIONS

This application is a continuation of copending International Application No. PCT/EP2009/007797, filed Oct. 30, 2009, which is incorporated herein by reference in its entirety, and additionally claims priority from German Application No. DE 102008057389.2-15, filed November 14, which is incorporated herein by reference in its entirety.

BACKGROUND OF THE INVENTION

The present invention relates to the transport of an object across a surface, like e.g. of a game piece across a game board.

The "classical" board game consists of a physical game plan (game board) and game pieces. The game pieces are put on the board and moved by the (human) players according to the game rules. A conventional computer has no access to such a classical game. It knows neither the position of the game pieces on the on the plan nor can it move the pieces.

In the adaption of a classical board game which is common today on a computer, game board and game pieces are set up "virtually" in the computer and displayed on the display of the computer. The computer knows the positions of all pieces on the virtual game plan. Movements of the game pieces only take place on this virtual game plan or program. The figures may only be moved in the narrow sense by "the computer". Of course, the computer may perform the move based on an input by a person. By this it becomes possible for a computer and person to play "together" on the virtual game plan or program. This mechanism may also be used in connection with a network to let different people take part in the same game when they are located in different spatially separated locations.

As humans like to take "real" game pieces into their hands and move the same and often think the representation on a physical game board advantageous, it is, for example, also common with chess game computers that in the computer the game plan and pieces are set up and moved virtually, but that the person imitates the moves outside the computer on a real game board. Via a suitable interface man and computer here tell each other the moves which were taken, the person updates the position of the game pieces on the physical game board.

In particular with chess game computers it is also common to make position changes of the game pieces directly detectable for the computer via mechanical or magnetic switches. Here, a switch is positioned below a firmly given game field. If a game piece is moved on the field, the switching mechanism in the start field of the move and in the destination of the move is operated. From this information, the chess game computer may electronically detect and store the move. The information which game piece is concerned in this move, is not detected in today's systems. This information is generated by the computer itself by updating all game moves based on a defined position of origin. Game moves of the computer displayed by the computer generally have to be taken by a human on the physical board.

There are also solutions in which the computer directly moves the game piece via a robot grip arm, but this is a very cost and time consuming method and is thus hardly used. Apart from this, these solutions are typically specialized to a certain game, for example, chess. Further, these solutions suffer from restrictions. Thus, for example, several game pieces may not be moved simultaneously.

In DE102006009451.4 it was proposed for the localization of game pieces on the game board to use an RFID technology, wherein in this respect below the fields of the game board an RFID reader or a reader antenna is attached and the game piece is provided with an RFID transponder. If the game piece is put onto a field, the transponder is read out and identified by the reader below the game field. The game piece is then associated to the position of the reader or the reader coil.

According to the still unpublished DE 102008006043.7
- the game plan is replaced by a lying computer display, e.g. in the form of an LCD, which may thus display any game plans.
- each game piece is provided with an optical sensor on the bottom side, has an ID and is connected via a radio connection to the game computer.

In the latter method, the game computer may automatically determine type and position of the game pieces located on the game board by a suitable combination of the information displayed on the game plan and remote readout of the sensor in the game piece. As this may be executed very accurately and fast, the game computer may track the position of the game pieces on the game board virtually continuously.

According to the above solution it is possible to build a universal computer adaption of a board game in which the computer represents a variable game plan on a screen acting as a game board and detects a position of a plurality of physical passive game pieces automatically. An automatic and efficient movement of these physical figures by the computer is not possible with little technical effort according to conventional technology. Only technically extensive special solutions with a computer grip arm or active self-moving game pieces are possible, which have many disadvantages, however.

It would be desirable, however, to make passive game pieces randomly distributed on a game board efficiently and automatically movable by a computer without having to use a robot grip arm or without requiring an active drive in the game pieces.

Problems of the above-described type of course also occur elsewhere and are not limited to game scenes. Apart from that, problems regarding the movement of the game pieces vary depending on the game. For example, a game with only one game piece presents less requirements regarding motion generation than a game with several game pieces, where one or a proper subset of the game pieces have to be moved relative to the other game pieces across the surface or the game board. Further, some game pieces are set up rotationally symmetrically, so that their rotational orientation relative to the surface normally is irrelevant, wherein this may be different with other game pieces and in some games the orientation of the game piece or its direction of view is important.

SUMMARY

According to an embodiment, an object for a controllable transport on an air cushion may have a level bottom; and a plurality of recesses in the level bottom, wherein at least a predetermined one of the recesses is adjacent to a side wall of the object and in the side wall an opening is formed through which air of the air cushion may escape laterally from the at least one predetermined recess.

According to another embodiment, a system for transporting an object on an air cushion may have a plurality of nozzles in a level surface which are controllable separately from each other in order to let compressed air stream out which forms an air cushion between the object and the level surface; a determiner for determining a position of the object on the level surface; and a controller for controlling the nozzles depending on the determined position.

According to another embodiment, a system may have a plurality of nozzles in a level surface through which compressed air may be guided; an object for a controllable transport on an air cushion generated by the compressed air, which may have a level bottom; a plurality of recesses in the level bottom, wherein at least one predetermined one of the recesses is adjacent to a side wall of the object and in the side wall an opening is formed through which air of the air cushion may escape laterally from the at least one predetermined recess; and a controllable unit for selectively closing and opening the opening; and a determiner for determining a position of the object on the level surface; and a controller for controlling the controllable unit for selectively closing and opening the opening in order to approximate the object to a desired position on the level surface.

According to another embodiment, a system for moving an object which may be magnetically attracted or repelled across a surface may have a plurality of magnetic coils distributed along the surface controllable separately from each other in order to generate magnetic dipoles with an alignment perpendicular to the surface; a determiner for determining a position of the object on the surface; a controller for controlling the plurality of magnetic coils distributed along the surface in order to approximate the object to a desired position on the surface.

According to another embodiment, a device for moving an object across a surface may have a bending wave generator for generating bending waves in the surface; a determiner for determining a position of the object on the surface; and a controller for controlling the bending wave generator, so that the object approaches its desired position on the surface based on the bending waves.

According to another embodiment, a method for transporting an object on an air cushion by means of a plurality of nozzles in a level surface which may be controlled separately from each other in order to let compressed air stream out forming an air cushion between the object and the level surface may have the steps of determining a position of the object on the level surface; and controlling the nozzles depending on the determined position.

According to another embodiment, a method for transporting an object by means of an air cushion generated by the compressed air and a plurality of nozzles in a level surface through which compressed air may be guided, wherein the object has a level bottom and a plurality of recesses in the level bottom, wherein at least a predetermined one of the recesses is adjacent to a side wall of the object and an opening is formed in the side wall through which the air of the air cushion may escape laterally from the at least one predetermined recess may have the steps of determining a position of the object on the level surface; and selectively closing and opening the opening depending on the determined position in order to approximate the object to a desired position on the level surface.

According to another embodiment, a method for moving an object which may be magnetically attracted or repelled across a surface by means of a plurality of magnetic coils distributed along the surface which may be controlled separately from each other in order to generate magnetic dipoles with an alignment perpendicular to the surface may have the steps of determining a position of the object on the surface; and controlling the plurality of magnetic coils distributed along the surface in order to approximate the object to a desired position on the surface.

According to another embodiment, a method for moving an object across a surface by means of bending waves may have the steps of determining a position of the object on the surface; and generating bending waves in the surface so that the object approximates its desired position on the surface based on the bending waves.

According to another embodiment, a computer program may have a program code for executing one of the above-mentioned methods when the computer program is executed on a computer.

A basic idea on which the present invention is based is that in case of the determination of a position of the object on the surface it is possible to also use transport mechanisms for the transport of the object on the surface which leads to less reproducible transport movements, as the control may be executed directly on the basis of the observed movement as compared to the desired movement.

According to a first object of the present invention, now this idea is used by causing transport by an air cushion between object and surface. "Carried" in such a way, the object may be moved laterally on the basis of very different means operating in a contact-less way, like e.g. by means of magnetic fields, electrostatically or the like. According to one embodiment, the generation of the air cushion is executed below the object laterally selectively at the location of the object as it was obtained by the location determination means. This way it is possible to reduce the transport friction of one or several selected objects among a plurality of objects specifically with respect to the other ones so that the means exerting the lateral force does not have to generate the force specifically only for the one or the several determined objects but also the generation of one field is possible which acts onto all objects, but only leads to an actual movement for the objects with the reduced transport friction. Additionally, the compressed air used for generating the air cushion which is blown through the surface across which the object is to be transported may not only be used for reducing the transport friction across the surface, but may also be used for generating the lateral movement or the generation of the lateral forces for moving the objects laterally across the surface. According to one embodiment, this is executed in combination with a special implementation of the bottom of the object in which several air chambers are formed, which are separated from each other and one or several of which comprise an opening in the side wall through which the air of the air cushion may escape laterally, whereby the object is subjected to a lateral force due to the resulting recoil. In combination with a suitable location determination means which determines the location of the object on the surface and in combination with a dense distribution of individually controllable air nozzles for generating the air cushion, in this way air may specifically be blown into a desired subset of the air chambers of the object, so that the object is moved into the desired position. Alternatively, of course also the provision of closing and opening mechanisms for closing and opening the lateral openings of the air chambers of the object is possible, wherein the need would be eliminated to individually control the air nozzles.

According to a further aspect, the transport movement generation takes place magnetically across the surface. Distributed along the surface, individually controllable magnetic coils are arranged, which may be controlled separately from each other to generate magnetic dipoles with an orientation perpendicular to the surface. When providing the object with an element which may be magnetically attracted or repelled, or a plurality of such elements, it is possible to shift the object across the surface, i.e. on the basis of magnetic repulsion, or to draw the same along, i.e. on the basis of magnetic attraction.

According to a further aspect, the transport movement is caused by bending waves in the surface. According to one embodiment, in this respect surface waves propagating in the surface are calculated according to a wave field synthesis such that the resulting movement component, which is tangential to the surface, of surface points of the surface at the surface wave peaks on which the object is mainly supported leads to a movement of the object in the direction of the desired position.

All aspects have in common that no grip arms or other superstructures are needed above the surface which might otherwise interfere with aesthetics of the apparatus or the game or with the application.

It is rather possible to hide the components needed for movement generation according to the above aspects below the transport surface. Here, these aspects also enable the position determination to be executed optically by the transport surface. According to embodiments of the present invention this is used by combining the individual transport mechanisms with a location determination means which uses a screen display in combination with an optical sensor in the object as it is described in more detail in the following. By this it is possible to integrate the transport surface together with most components needed for position determination and transport movement generation in a member which is further able to display any pattern on the transport surface.

BRIEF DESCRIPTION OF THE DRAWINGS

Embodiments of the present invention will be detailed subsequently referring to the appended drawings, in which:

FIG. 5a,b show top views onto an air nozzle according to an embodiment in a closed or open state;

FIG. 9b shows a schematical top view onto the array of FIG. 9a;

FIG. 26b shows a sectional side view of a game piece which may be used together with the component of FIG. 26a.

DETAILED DESCRIPTION OF THE INVENTION

Figure 1:
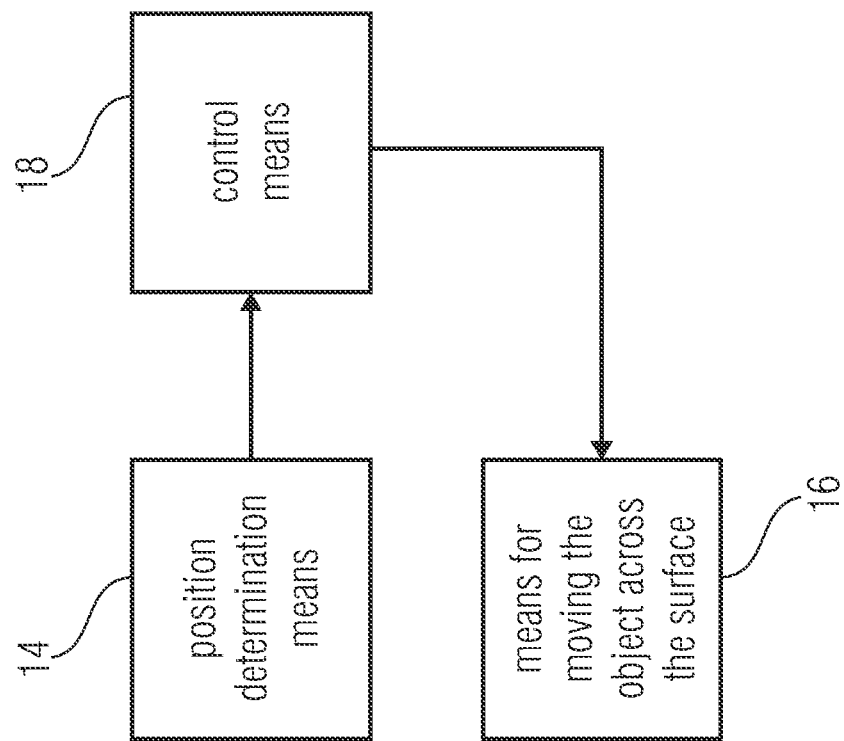
FIG. 1 shows a schematical block diagram of a system for transport or movement of an object across a surface.
Figure 1:
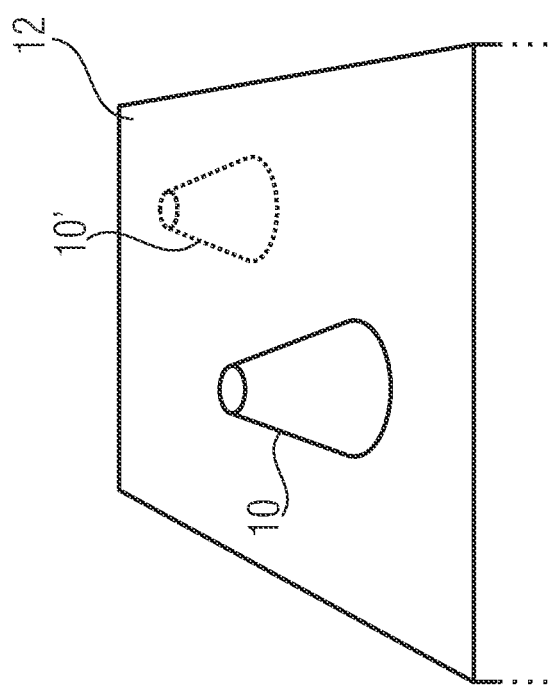

In the following, different embodiments of the present invention are explained in more detail. Here, elements occurring repeatedly in different figures are provided with same or similar reference numerals and a repeated description of the same or their functioning is avoided.

In particular, different embodiments for the different aspects mentioned above are described which may, however, also partially be combined with each other which is noted in the following in different places.

Although the description frequently refers in particular to game applications, the present invention may of course also be applied to other fields of application in which objects are to be moved automatically across a surface, like e.g. in logistics applications or the like.

FIG. 1 generally shows a system for moving an object 10 across a surface 12. It includes a position determination means 14 which is able to determine the position of the object 10 on the surface 12, like e.g. the lateral position, e.g. of the center of gravity and/or the lateral direction of view or the twisting of the object around a surface normal of the surface 12 with respect to a reference direction. For the position determination means 14 in the following with reference to FIGS. 16-25 embodiments are described, according to which the position determination means 14 comprises an optical sensor in the object 10 and a display displaying its screen display from the back side of the surface 12 through the surface 12 into the direction of the front side on which the object 12 is positioned. Other position determination means 14 are also possible, however, and for example include a camera (not shown) recording the transport surface 12 from the front side, i.e. with respect to FIG. 1 from the top, or other distance sensors for example operating contactlessly, like e.g. two or more distance sensors which are arranged along an edge of the transport surface 12.

The system of FIG. 1 further includes a means for moving the object across the surface, i.e. the means 16. The means 16 thus executes the actual movement without user interaction. For the moving means 16 in the following in particular with reference to FIGS. 2-16 different embodiments are described. According to these embodiments, the moving means 16 is implemented such that the forces to change the position 10 of the object on the surface 12 are exerted to the object 10 contactlessly, like e.g. by means of compressed air, magnetically or by means of bending waves. Other mechanisms or combinations of the same are also possible, however, which is referred to in the following.

The position determination means 14 and the moving means 16 are coupled to each other. In particular, the position determination means 14 and the moving means 16 may, for example, be coupled to each other via a control means 18. The control means 18 for example includes a processor executing a suitable program. In particular, the control means 18 is implemented to control the moving means 16 on the basis of the position of the object 10 on the surface 12 determined by the position determination means and a predetermined reference position or desired position of the object 10 such that the object 10 approaches the desired position whereby a control loop results which causes the object 10 to reach its desired position. From where the desired position is provided may be different depending on the application. The desired position may be provided externally to the control means 18. The control means 18 may, however, apart from its function as a control for the moving means 16 also execute further functions influencing the desired position of the object 10. For example, the control means 18 also functions as a game computer which is either able to receive desired position changes of the object 10 manually from a player via a certain input device and/or to calculate desired position changes of the object 10 independently. Suitable input means for example provide a keyboard, a mouse, a speech input, a touch screen capability of the surface 12 or the like. As already mentioned, also other applications are possible in which the system according to FIG. 1 may be used, like e.g. logistical applications, wherein in this case the control means 18, for example, simultaneously takes over logistical tasks to calculate, among others, also the desired position of the object 10.

Although it will be addressed several times in the following, it is noted that it is possible that the position determination means 14 and the moving means 16 are implemented so that they are able to handle several objects 10 and 10' on the surface 12 individually, i.e. determine their respective position or move the same individually relative to the other object. Accordingly, the control means 18 may be implemented such that it manages the desired positions of the several objects 10 and 10' or at least executes the regulation or control of their desired positions.

With reference to FIGS. 2 to 8 in the following embodiments are described according to which the means 60 for moving the object across the surface generates an air cushion between an object and a transport surface, so that the conventionally occurring static friction and dynamic friction of the object between the bottom of the object and the transport surface are overcome in favor of a substantially lower friction due to the air cushion.

Figure 2:
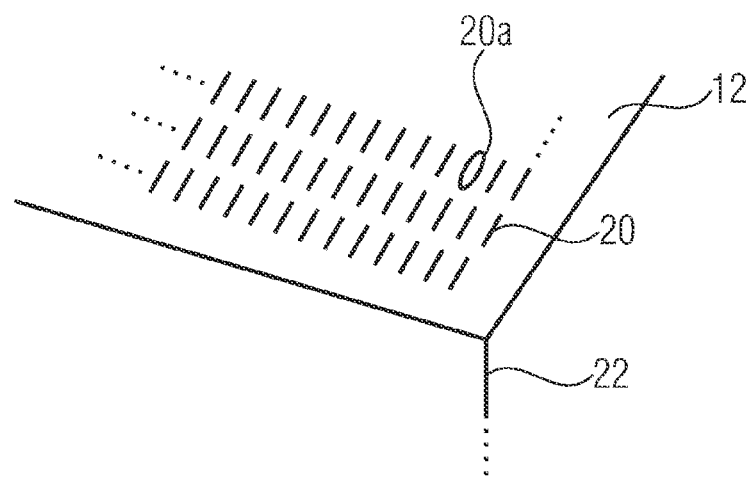
FIG. 2 shows a partial spatial view of a nozzle plate.

FIG. 2 exemplarily shows the surface 12, i.e. the transport surface, with an array or with a lateral distribution of air nozzles 20. In FIG. 2 the lateral distribution is illustrated as a regular lateral distribution in lines and columns. Other regular arrangements and irregular lateral distributions of the air nozzles 20 are also possible, however. Additionally, the air nozzles 20 are illustrated exemplarily in FIG. 2 as being individually controllable or individually closable/openable, except for one opening 28 all openings being illustrated in a closed state. As it is described later with reference to FIG. 7, it is also possible, however, that the moving means 16 uses constantly open air nozzles 20 or such which may only be controlled together. Apart from this, the air nozzles are illustrated as though they were closable and openable at the air outlet, i.e. as air valves. However, it is also possible to make air nozzles individually controllable by valves located in the air channels associated with the air valve, the channels connecting air nozzles to a pressure source.

In FIG. 2, the transport surface 12 was exemplarily illustrated as a main side of a parallelepiped-shaped body, like e.g. a nozzle plate 22, whose front side forms the transport surface 12 and comprises the air nozzles 20. Other forms are also possible, however.

Although it is not explicitly illustrated in FIG. 2, the air nozzles 20 are of course fluidically connected to a pressure source, so that in the opened states of the air nozzles, as illustrated in 20a, pressurized air escapes from the nozzle. The pressurized air leaves the nozzle 20 for example along a surface normal of the transport surface 12. The nozzles may, however, also be implemented so that the air escapes the nozzle 20 in a direction which is inclined with respect to the surface normal. The lateral direction of tilt, i.e. tangential to the surface 12, may here for example be different for the different air nozzles 20, which is referred to again in the following.

Figure 3:
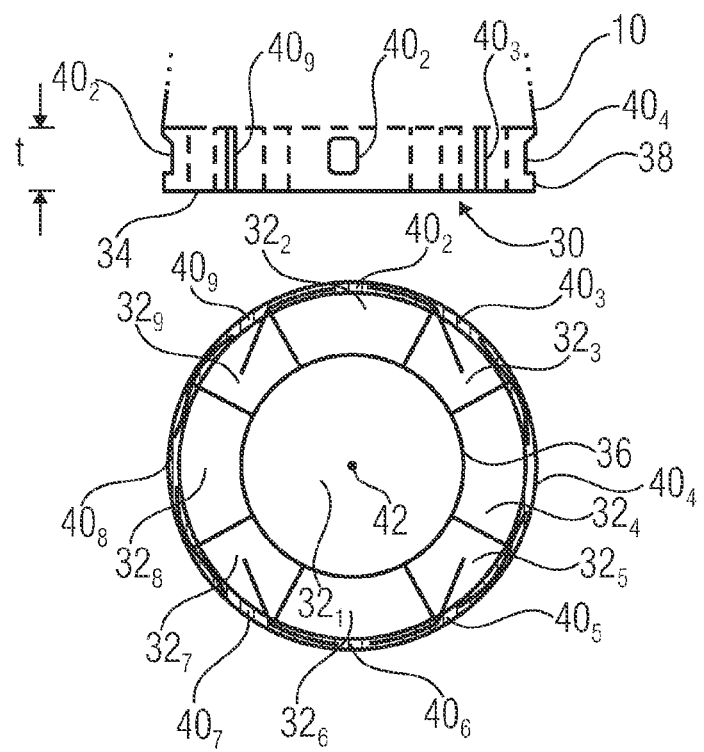
FIG. 3 shows a bottom view onto a bottom of an object according to an embodiment.

With reference to FIGS. 3 to 6b now an embodiment is described in which an array of individually controllable air nozzles is used in combination with an object whose bottom is implemented accordingly in order to generate the lateral movement of the object on the surface. FIG. 3 exemplarily shows a possibility for implementing the bottom of the object 10. In the upper part of FIG. 3, the associated side view of the object 10 is represented for a better understanding.

As it is illustrated in FIG. 3, in the bottom 30 of the object 10 several recesses $32_1$-$32_9$ are formed. Otherwise, the bottom or floor 320 is level, i.e. it comprises a level supporting surface 34. As it is exemplarily illustrated in FIG. 3, the depressions or recesses $32_1$-$32_9$ may comprise a common depth t up to which they extend from the supporting surface 34 into the interior of the object 10. As it is illustrated in FIG. 3, the recesses $32_1$-$32_9$ are separated by interior walls 36 passing perpendicular to the supporting surface 34. Further, among the recesses there are ones, i.e. recesses $32_2$-$32_9$, which are adjacent to an exterior side wall 38 of the object 10. In the exemplary case of FIG. 3, in the side wall 38 for each of the recesses $32_2$-$32_8$ an opening $40_2$-$40_9$ is provided which enables air forming the air cushion below the object 10 to laterally escape the corresponding recess $32_2$-$32_9$. In a 90° angle to each other for example openings $40_2$, $40_4$, $40_6$ and $40_8$ are provided which are provided to let air stream out radially from the object 10 exemplarily formed in FIG. 3, rotationally symmetrical around a rotation axis 42. Offset by 45° hereto four openings $40_3$, $40_5$, $40_7$ and $40_9$ are provided in a 90° angle to each other to let air stream out of the corresponding recesses or chambers $32_3$, $32_5$, $32_7$ and $32_9$ in directions comprising a tangential component. In particular, these openings are implemented in pairs so that an opposing pair of openings $40_3$ and $40_7$ or $40_5$ and $40_9$ lets air stream out in the same direction of rotation, i.e. counter-clockwise regarded from above or in a clockwise direction regarded from above.

Figure 4B:
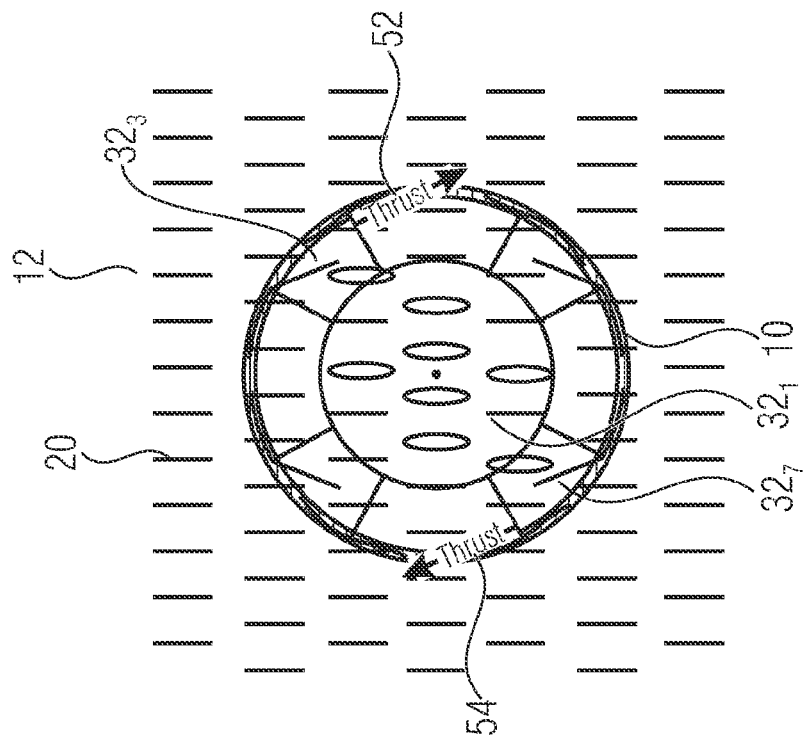
FIG. 4a,b show schematical top views onto a nozzle plate having individually controllable air nozzles and with an object located on the surface with a bottom according to FIG. 3, wherein FIGS. 4a and 4b cause different position changes by activating different air nozzles.
Figure 4A:
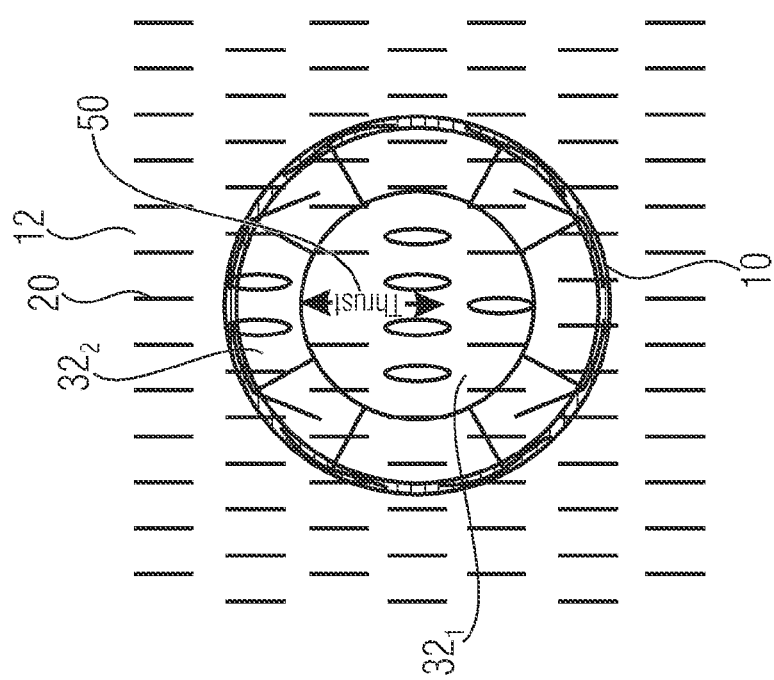

As it will be illustrated exemplarily with reference to FIGS. 4a and 4b, it is possible due to the implementation of the recesses and the chambers formed by the same by a suitable selection of a subset of those chambers which are to receive compressed air from the air nozzles, to rotate the object 10 on the surface and/or move the same in a desired direction, i.e. cause any mix of a translational movement and rotation around the axis 42. Thus, the compressed air in the chamber $32_2$ causes by the air laterally streaming out through the opening $40_2$, that the object 42 moves in the direction opposite to the laterally outstreaming air. This applies to the openings $40_4$, $40_6$ and $40_8$ accordingly. If compressed air simultaneously streams into chambers $40_3$ and $40_7$, the discharged air in the corresponding openings causes a rotation of the object in a clockwise direction (considering FIG. 3). A correspondingly opposed rotation is achieved by guiding compressed air into the chambers $32_9$ and $32_5$. The chamber $32_1$ enclosed at all sides by walls—in FIG. 3 interior walls 36—when filled with compressed air causes no lateral forces onto the object 10 and may thus be filled with compressed air to carry the object 10 by means of the corresponding air cushion between the object 10 and the surface.

The interaction between the control means 18, the individually controllable air nozzles 20 and the special implementation of the bottom 30 of the object 10 is to be illustrated in the following again with reference to FIGS. 4a and 4b. FIG. 4 shows a section of the transport surface 12 and the individually controllable air valves 20. The position of the object 10 on the surface 12 indicated in FIG. 4a is known to the control means 18 via the position determination means 14. In FIG. 4a it is assumed that the desired position plans the object 10 to be shifted in the southward direction (bottom in FIG. 4a). Accordingly, the control means 18 next to the air valves 20 located below or laterally aligned with the central air chamber $32_1$ activates or opens those air openings 20 which are aligned with the air chamber $32_2$ located in the north, so that the air streaming out laterally through the corresponding opening of this chamber $32_2$ shifts the object 10 carried by the air cushion generated by the opened air nozzles 20 in the desired direction, as it is indicated by an arrow 50. In FIG. 4a the opened air valves are indicated by an oval and the closed air valves by a line.

FIG. 4b shows the same starting position as FIG. 4a. In this case, it is assumed, however, that the control means 18 has to rotate the object 10 for approximating the object 10 to the desired position, that is in a clockwise direction. Accordingly, apart from the air valves 20 blowing their air into the central chamber $32_1$ it opens those air valves 20 opposite to the opposing air chambers $32_2$ and $32_7$. The air streaming out laterally from the chamber $32_3$ generates a thrust 52 in the tangential direction which is opposite to the direction of the thrust 54 resulting from the air streaming out laterally from the opposite air chamber $32_7$, whereby the desired rotational movement of the object 10 in clockwise direction is achieved.

It is to be noted that the special implementation of the bottom according to FIG. 3 is only an example. Many modifications are possible. If, for example, rotational movements of the object 10 are not of importance, the object 10 only comprises three openings which let the air stream out radially and are, for example, arranged in 120° angles to each other. If the trajectory of the object 10 is, for example, otherwise determined on the surface 12, like e.g. by corresponding boards, then possibly only providing a lateral recess with a corresponding opening in the side wall 38 next to a further recess or chamber is sufficient, which comprises no lateral opening in the side wall like the chamber $32_1$.

In the above description of FIGS. 2-4b, the air nozzles 20 sometimes were also called air valves. The reason for this is that the individual control of the air nozzles may either take place directly at the air nozzle, wherein in this case the same acts as an air valve, or to each air nozzle which is constantly open a valve may be associated via which the respective air nozzle may be controlled individually. To each pair of such an air nozzle and an associated valve, a corresponding air channel would be specifically allocated, which needs a lot of space.

FIGS. 5a and 5b show an example of a closed and open state of the air valve 20. According to FIGS. 5a and 5b the air valves are formed of silicon 60. For example, the whole body 22 (FIG. 2) consists of silicon or a main carrier like e.g. a glass plate has a matrix of holes which were, for example, drilled into the glass plate and into these holes the individual silicon valves according to FIGS. 5a and 5b are fitted. For example, the material 60 of the valve, like for example silicon, has a refractive index which is equal to the refractive index of the material of the carrier plate, i.e., for example, glass, wherein in this case, for example, a completely transparent appearance results through the surface 12. The refractive index may, for example, be 1.43. In the advantageously elastic valve material 60, for example a slot 62 is provided which passes from the surface 12 through to the opposing side 64 where, for example, compressed air may be applied. The slot was for example cut into the elastic material 60.

Laterally along the slot electrodes 60 and 68 are provided to which a different potential may be applied. An interior coating 70 in the slot 62 guarantees that in the closed state illustrated in FIG. 5a the electrodes 66 and 68 do not touch. Of course, such an interior coating 70 may also be missing when the electrodes 66 and 68 are spaced apart from the slot 62 so that the same do not contact each other even in the closed state.

In the case of FIG. 5a, now the control means 18 causes the air valve of FIG. 5a to be closed. In this respect, a different electric potential is applied to the electrodes 66 and 68. In FIG. 5b the case is illustrated that the electrodes 66 and 68 are charged with charge carriers of the same polarity. According to the embodiment of FIGS. 5a and 5b, thus the electrodes 66 and 68 of an air valve may be coupled to two different voltage sources wherein the electrodes 66 and 68 are each connected to the same pole. In FIG. 5b this is, for example, the negative pole. The thus resulting electrostatic repelling force between the electrodes 66 and 68 causes the slot 62 to open into an oval, as illustrated in FIG. 5b.

The embodiment according to FIGS. 5a and 5b is of course only an example and other implementations are also possible. Additionally, FIGS. 5a and 5b were illustrated in a simplified way insofar as the feed lines to the electrodes 66 and 68 are not illustrated. For an individual control of the air valves, the same, however, have to be connectable or detachable to/from the above-mentioned voltage sources via respective individual lines. Further, it is also noted that in FIGS. 5a and 5b the line 72 is to exemplarily illustrate the possible interface between the valve material 60 and the above-mentioned carrier plate, like e.g. the glass plate.

Figure 6B:
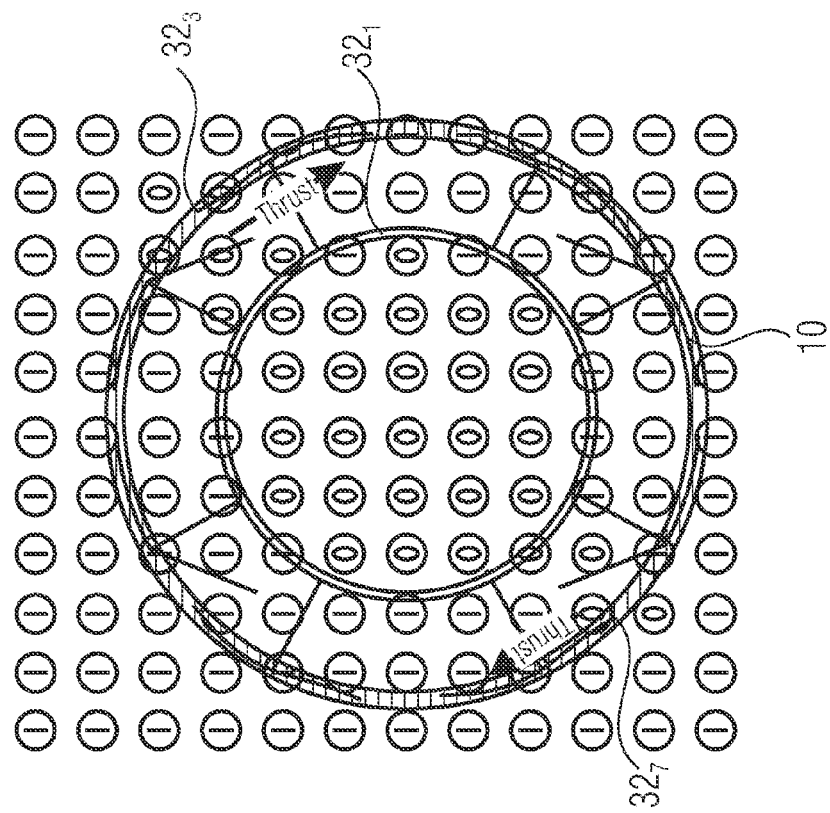
FIG. 6a,b show top views as in FIGS. 4a and 4b for air nozzles of the type according to FIGS. 5a and 5b.
Figure 6A:
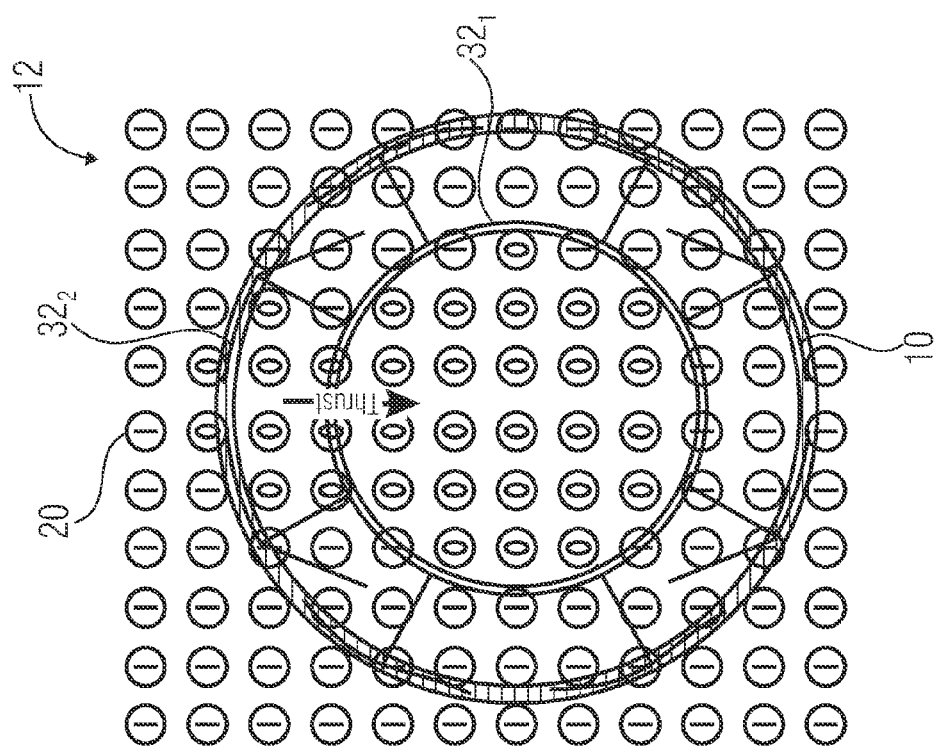

FIGS. 6a and 6b show, applied to the embodiment of the air valve according to FIGS. 5a and 5b, the control of a matrix of corresponding air valves for generating movements as they are illustrated in FIGS. 4a and 4b. Briefly, FIGS. 6a and 6b show a section of the transport surface 12 exemplarily provided with an array of valves 20 according to FIGS. 5a and 5b, wherein an object 10 is located on the surface 12, comprising a floor design according to FIG. 3. As illustrated in FIG. 6a, the air valve 20 arranged below the chamber $32_1$ and $32_2$ are located in the open state according to FIG. 5b in order to achieve the movement into the southward direction as it was the case in FIG. 4a, and in FIG. 6b only those air valves are in the state according to FIG. 5b which are arranged below the chambers $32_1, 32_3$ and $32_7$, while the respective other air valves are in the closed state according to FIG. 5a.

Figure 25:
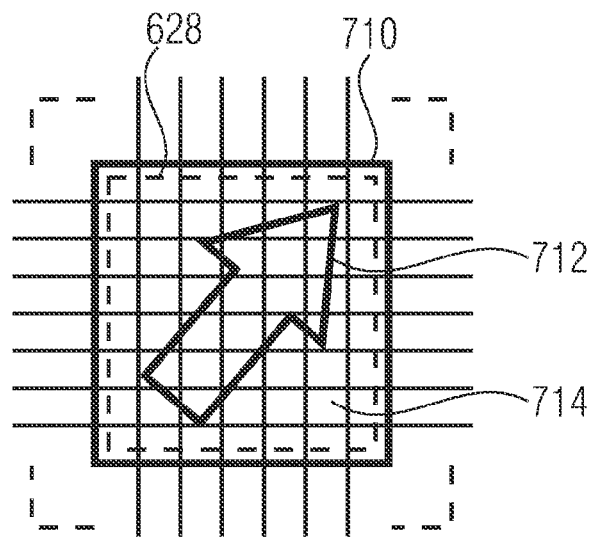
FIG. 25 shows a schematical illustration of a photo cell covered by a mask according to one embodiment.
Figure 26A:
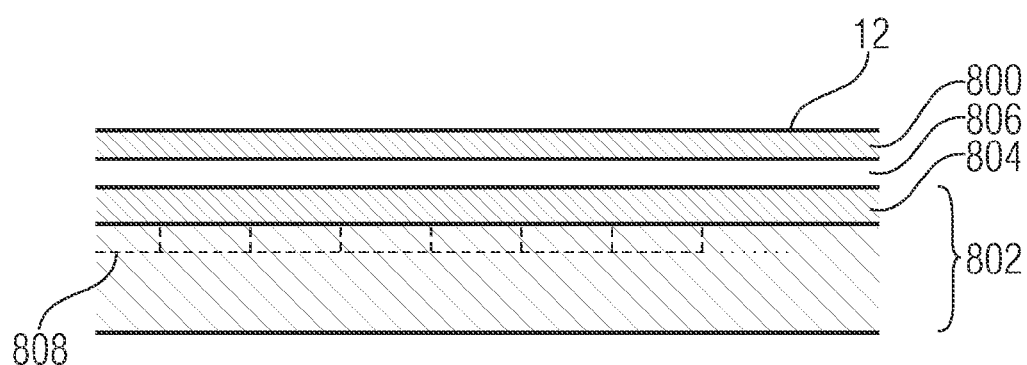
FIG. 26a shows sectional views through a setup of an element forming the transport surface and including parts of the movement generation means and the position determination means so that outside the same only controlling and evaluating units are needed, like for example a computer.
Figure 26B:
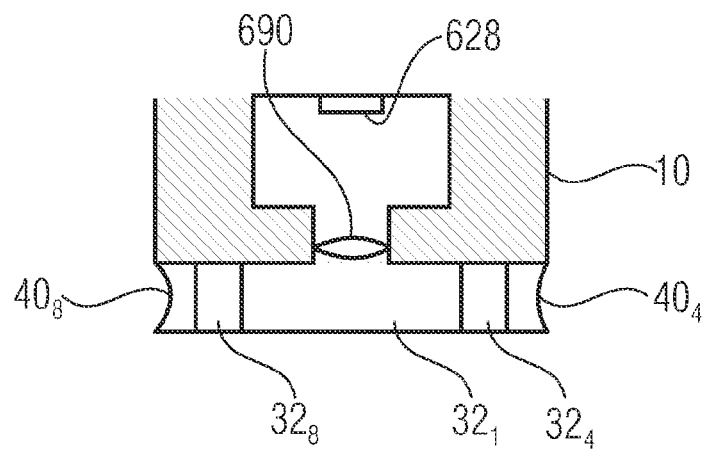

As it will be described later with reference to FIGS. 26a and 26b, the implementation of the air valves carried by a glass plate having the same refractive index as it was described with reference to FIGS. 5a-6b has the advantage that with closed air valves the appearance of the glass plate is not interfered with by the air valves. In other words, with closed air valves no "points of discontinuity" result, which affect the transparency of the plate, which is in particular advantageous according to the embodiments of FIGS. 16-25, according to which the position determination means 14 uses a display located below the transport surface to execute position determination.

An average smallest distance between the air nozzles 20 is for example smaller than a lateral extension of the recesses $32_{2-9}$. Advantageously, an average smallest distance between the air nozzles 20 is smaller than or equal to a smallest lateral dimension of the recesses $32_{2-9}$. Depending on the movement which the object is to execute due to its offset from the desired position, the control means 18 then selects those nozzles for blowing which lie below the suitable recesses $32_{2-9}$.

In FIGS. 2-6b the lateral forces for changing the position of the object carried by the air cushion were generated by the compressed air for generating the air cushion itself by ventilating corresponding air chambers or blowing air into corresponding air chambers.

Figure 7:
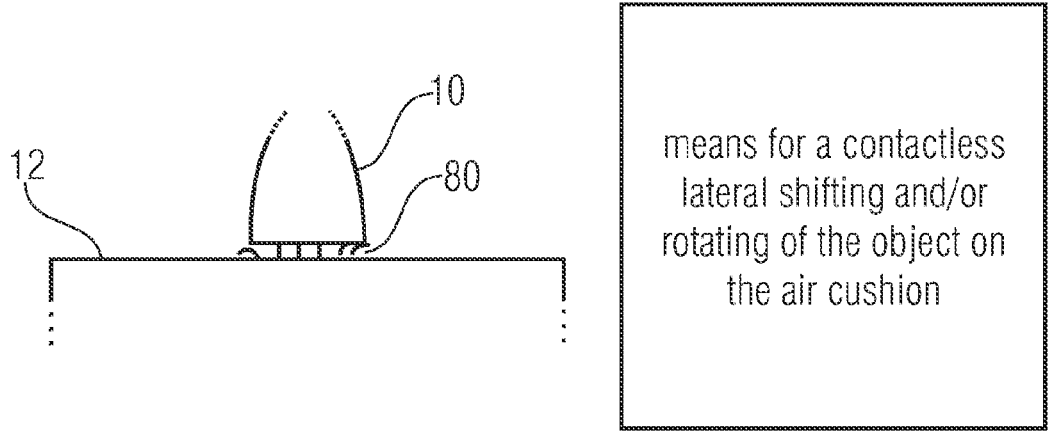
FIG. 7 shows a schematical view of a part of the system of FIG. 1 for illustrating a possible means for moving the object across the surface according to one embodiment.

FIG. 7 shows a possibility for implementing the means 16 for moving the object across the surface, according to which the same comprises an array of individually controllable air nozzles in the surface 12 for generating an air cushion 80 between the object 10 and the surface 12, i.e. specifically at the location of the object 10, and a further means 82 for a contactless lateral shifting and/or rotating of the object 10 on the air cushion 80. The means for a contactless lateral shifting 82 may, for example, use electrostatic forces, magnetic forces or a tilting of the surface 12 relative to the gravitation field in order to cause the desired change of position of the object 10 on the surface 12.

In case that only one object 10 among several objects on the surface 12 specifically was changed regarding its position, the means 82 is not restricted to such implementations which are able to specifically influence the desired object 10. Rather, the specific generation of the air cushion 80 below the desired object 10 enables that only for this object 10 the static and dynamic friction otherwise acting between the surface 12 and the object 10 is removed so that the lateral forces by means 82 lead to a lateral movement only for the desired object 10.

One possibility for implementing the means 82 here for example provides that the object 10 is not moved by generating corresponding fields but that the lateral openings in the floor chambers are selectively opened and closed in case of FIG. 3. In addition to the implementation of FIG. 3, in case of FIG. 8, means $84_{2-9}$ are provided for a selective opening and closing of the openings $40_2$-$40_9$, which may, for example, be controlled via a wireless interface by the control means 18. According to the above description, the control means 18 controls the means 84 so that air may only escape laterally through the desired openings $40_2$-$40_9$, wherein the air otherwise forms the air cushion 80.

Figure 8:
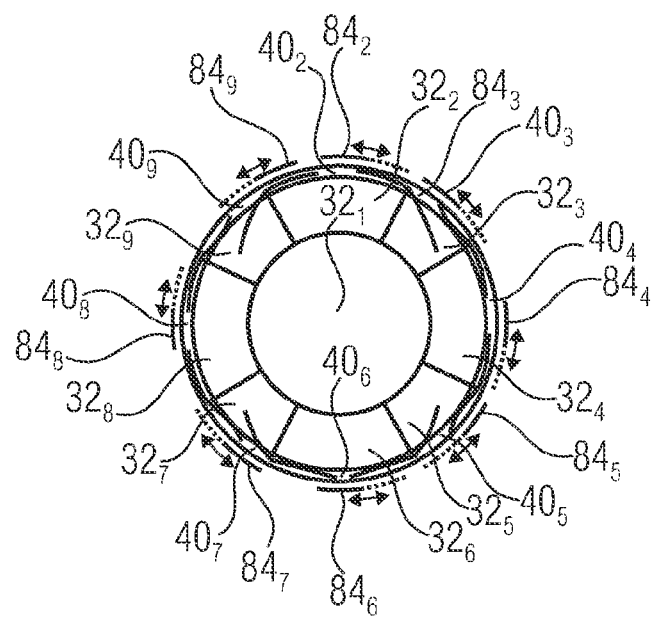
FIG. 8 shows a bottom view of the bottom of an object according to a further embodiment.

In the alternative according to FIG. 8, it is noted that in the case of using means for selectively closing and opening the openings each associated with the openings, also the use of air nozzles would be possible, which may only be controlled together or may not be controlled, but be constantly opened. If in this case several objects 10 were located on the surface 12, then with objects which should not change their position the set of means $84_2$-$84_9$ could be controlled so that all corresponding openings close, so that the corresponding air cushion only acts in a carrying way below the same. Only with the object or those objects which are to be moved, one or more of the openings are opened by the means $84_2$-$84_9$.

While the above-described embodiments described with reference to FIGS. 2-8 had in common that an air cushion is generated between object and transport surface, this only presents an optional measure for the embodiments described in the following with reference to FIGS. 9a-13b. According to the embodiments described in the following, the position change of the object on the surface is generated by a suitable control of a lateral distribution of individually controllable magnetic coils arranged distributed along the transport surface.

Figure 9A:
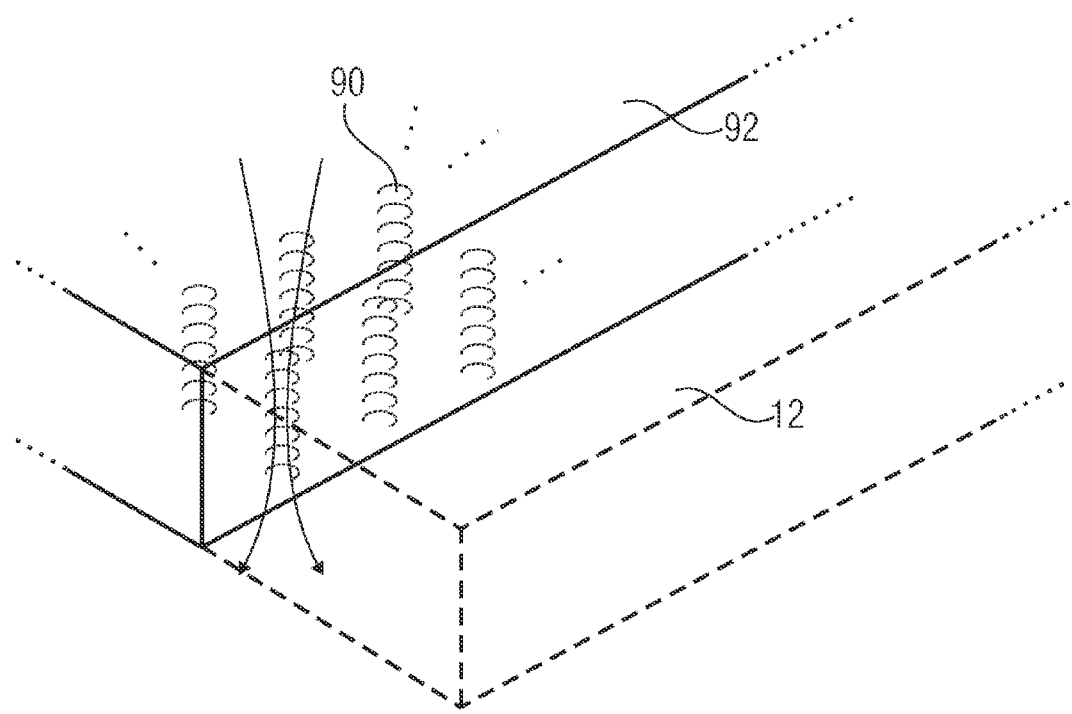
FIG. 9a shows a partial spatial view of a magnetic coil array according to one embodiment.
Figure 9B:
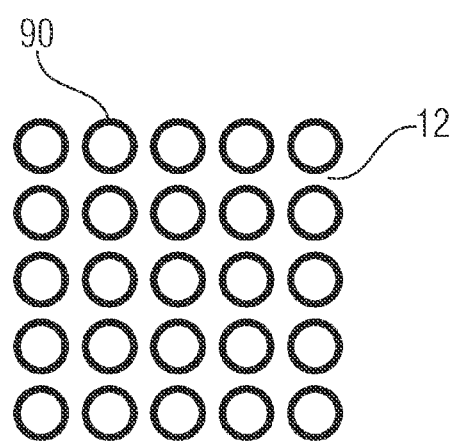

FIGS. 9a and 9b exemplarily show the transport surface 12 along which an array of magnetic coils 90 is arranged so that the magnetic flow generated by a current flow through this magnetic coil 90 basically runs symmetrically to an axis which is perpendicular to the surface 12. In other words, a longitudinal axis of the magnetic coils 90 is perpendicular to the surface 12. As indicated in FIG. 9a, the magnetic coils 90 are, for example, embedded in a carrier material 92 for example consisting of magnetically permeable material. The individual controllability of the magnetic coils 90 is caused by corresponding lines and switches which are not illustrated in FIGS. 9a and 9b for simplifying the illustration, and which enable that for the individual magnetic coils 90 a current flow may be generated individually through the same.

Depending on the embodiment it may be the case that the magnetic coils 90 may either only be set into two states like, e.g., a current-carrying and a non-current-carrying state or a state subjected to alternating current and a current-less state, or into three states, i.e. a current-less state and two further states different regarding the direction of current flow. Combinations of these controllabilities may also be possible, like e.g. by providing an individual or selective connectability of the magnetic coils 90 to a voltage source which again provides, for all magnetic coils 90 equally, depending on the setting by the control means 18, alternating current, direct voltage into one or direct voltage into the other direction.

When the means 16 for moving the object across the surface (FIG. 1) comprises a distribution of individually controllable magnetic coils 90, the control means 18 is able to offset the object 10 from the current position received from the position determination means 14 into a desired position. In this respect, the object 10 itself may either consist of magnetically attracting and/or repelling material, like e.g. iron, or the object is locally provided with one or several such magnetically attracting and/or magnetically repelling elements in an otherwise magnetically permeable material.

Figure 10A:
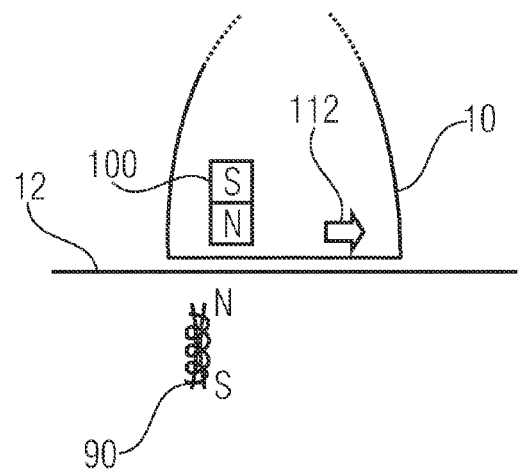
FIG. 10a-c show schematical side views of an object located on the transport surface with different magnetical modes of action between the magnetic array and the object according to different embodiments.
Figure 10B:
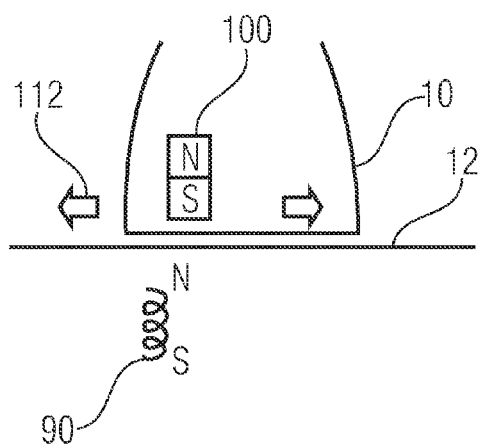
Figure 10C:
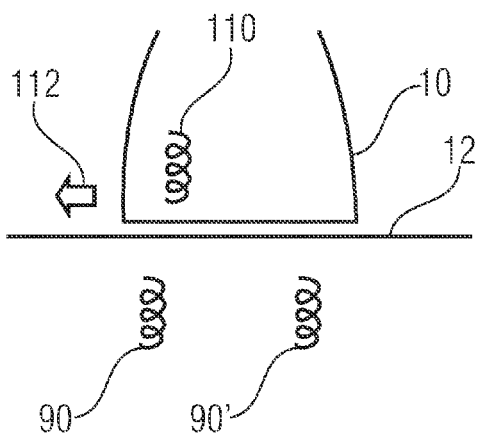

FIGS. 10a-10c show embodiments in which the object 10 is made of an otherwise magnetically permeable material, wherein, however, in the region of the bottom of the object 10 a magnetically attracting and/or magnetically repelling element is arranged like, e.g., cast into a magnetically permeable material. The magnetically permeable material may, for example, be plastics. According to FIGS. 10a and 10b the element 100 is, for example, a permanent magnet. According to the embodiment of FIG. 10c, the element is, for example, a coil 110. As it will be described in the following, in one object of course several elements 100 or 110 may be arranged in laterally different positions along the supporting surface of the object 10. In case of FIGS. 10a and 10b the magnetic poles of the permanent magnet 10 are exemplarily arranged along a surface normal of the transport surface 12, in case of FIG. 10c, the coil axis along the surface normal.

FIG. 10a exemplarily shows how the control means 18 may use a magnetic repelling force to move the object 10 along the surface 12. In this respect, the control means 18, for example, activates one of the coils 90 along the surface 12 so that its magnetic north pole is facing the north pole of the permanent magnet 100 across the surface 12, that is the magnetic coil 90 of the plurality of magnetic coils arranged offset relative to the location of the permanent magnet 100 in one direction which is opposite to the direction 112 into which the object 10 is to be moved. The magnetic repulsion between the permanent magnets 100 and the excited coil 90 causes a force into the desired direction 112.

On the other hand, the control means 18 is able to control a magnetic coil 90 arranged in the desired shifting direction 112 offset to the permanent magnet 100 so that its magnetic north/south alignment corresponds to that of the permanent magnet, so that opposing poles of the coil 90 and the permanent magnet 100 are opposite to each other across the surface 12 and the resulting magnetic attracting force causes a lateral shifting of the object 10 in the desired direction 112. In case of FIG. 10b, the control means 19 excites the one magnetic coil 90 among the plurality of magnetic coils which is arranged offset relative to the location of the permanent magnet 100 in one direction which is rectified or equal to the direction 112 into which the object 10 is to be moved.

In case of FIG. 10c, different control possibilities exist. If applicable, in the object 10 a current generation means which is not illustrated in FIG. 10c like, e.g., a battery or an accumulator is arranged, which generates a current flow in the magnetic coil 110 of the object 10 so that the latter again acts in this state like one of the permanent magnets 100. In this case, the control means 18 may execute the control as is described in FIGS. 10a and 10b.

The magnetic coil 110 does not have to be controlled externally for example by an object internal battery or the like to be current carrying and thus to behave like a permanent magnet. The magnetic coil 110 may also be short-circuited at its ends via a branch parallel to the coil 110 or they may be electrically connected to each other via an impedance. In this case, a magnetic field being built up or down by the excitation coil 90 induces a current through the magnetic coil 110 of the object 10 which in turn generates a magnetic field opposite to the magnetic field change, i.e. an opposing magnetic field in case of an increasing magnetic field generated by the excitation coils 90 and a rectified magnetic field in case of a decreasing magnetic field generated by the excitation coil 90. The control means 18 may use this effect by controlling those magnetic coils 90' which are arranged in the direction opposite to the desired direction 112 offset to the coil 110 so that they generate a magnetic field getting stronger at the coil 110 which shifts the objects 10 in the desired direction 112 due to the induced current in the magnetic coil 110 and controls those magnetic coils 90 arranged in the desired direction 112 offset from the coil 110 so that they generate a magnetic field getting weaker which causes an attraction of the magnetic coil 110 and thus of the object 10 in the direction 112. The control means may execute this, for example such that for example the excitation coil 90 or 90' are sequentially controlled so that below or in the area of the magnetic coil 110 of the object 10 in the direction 112, the excitation coils in the direction 112 in front of the magnetic coil 110 first of all lead to an increase of the magnetic field at the location of the magnetic coil 110, whereupon the magnetic coils in the direction 112 behind the magnetic coil 110 lead to a decrease of the magnetic field at the location of the magnetic coil 110. In contrast to the embodiments of FIGS. 10a and 10b, thus, the excitation location where the excitation coils 90 are activated by the control means 18 does not push the object in front of the same or pull it along, but the excitation location cyclically passes the floor space in which the object 10 is currently located in the desired direction 112.

Shifting across longer distances, i.e. more that an inter-coil distance, is caused by the control means by selectively activating the coils so that a location in which the activated coils 90 are located hurries ahead or behind the current location of the object 10 or that determined by the means 14 in order to—as described above—"draw along" or "push ahead" the object.

FIGS. 11a and 11b again show the possibility to provide the object 10 with magnetically attracting and/or magnetically repelling elements arranged offset to each other in an otherwise magnetically permeable material of the object 10. In particular in the case of FIG. 11a two coil windings 110a and 110b are arranged laterally offset to each other, while in the case of FIG. 11b in the base of the object 10 two permanent magnets 100a and 100b are provided and arranged offset to each other whose magnetic north and south pole are arranged exemplarily equally and along a surface normal of a supporting surface of the object 10. The longitudinal axes of the coils 110a and 110b also pass perpendicular to a supporting surface of the object 10.

Figure 11A:
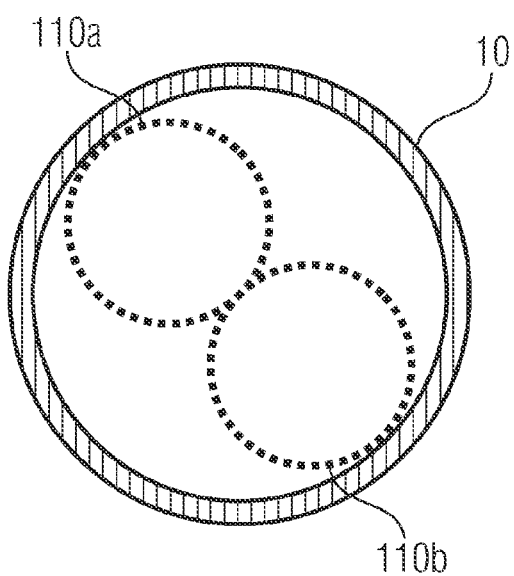
FIG. 11a,b show schematical plan views of an object having different elements which may be magnetically attracted or magnetically repelled.
Figure 11B:
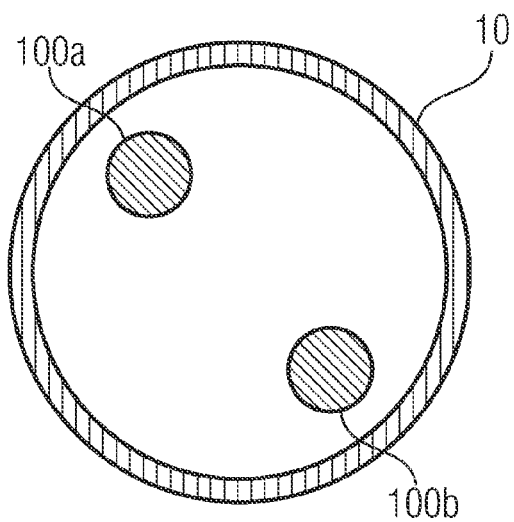
Figure 12A:
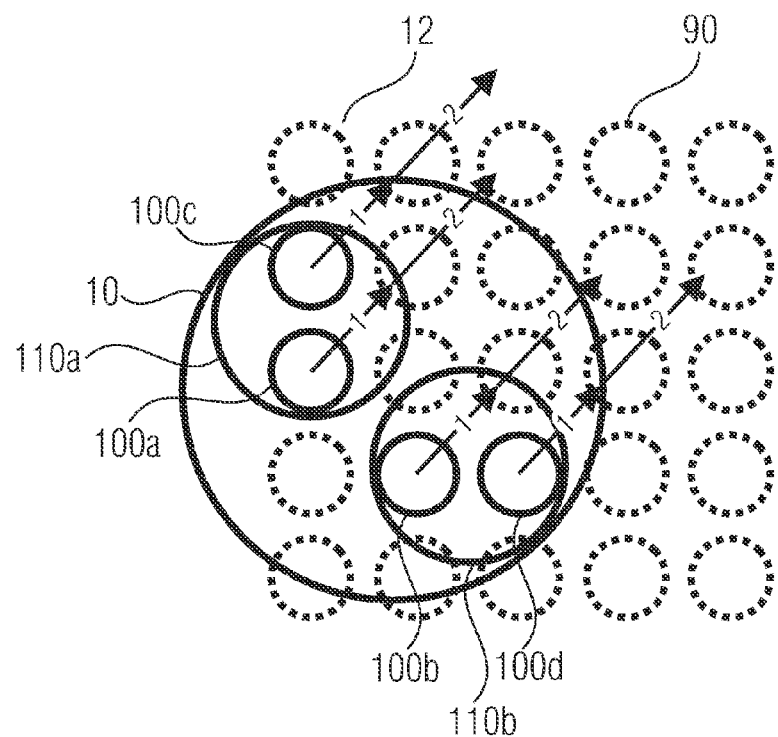
FIG. 12a,b show schematical top views onto a magnetic coil array and an object located on the same with an illustration of examples of different activation patterns of magnetic coils in the magnetic array for generating different position changes of the object on the surface.
Figure 12B:
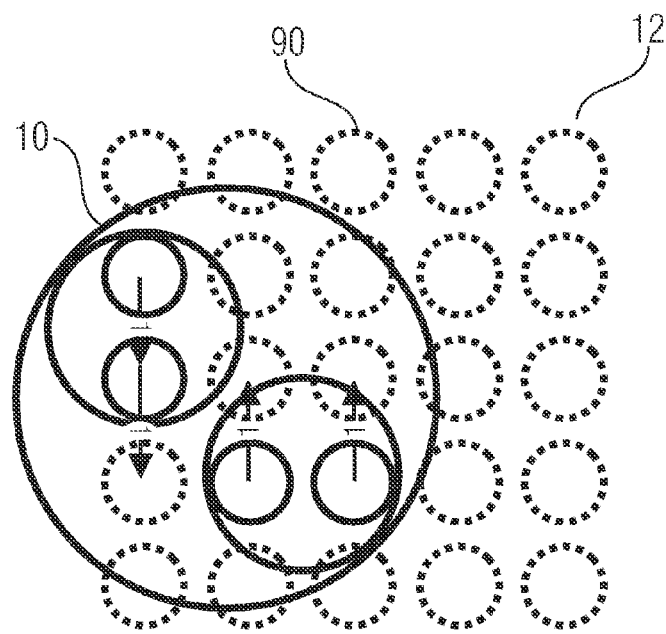

FIGS. 12a and 12b are to illustrate how the control means 18 may generate a translational movement and a rotational movement of the object 10 when the object 10 according to FIG. 11a and FIG. 10c comprises a passive magnetic coil or according to FIG. 11b a magnet, wherein a magnetic attracting force between this magnet and the magnetic coils of the array along the surface 12 is used.

FIG. 12a shows the object 10 in a certain starting position, wherein the control means 18 wants to move the object 10 translationally into the direction of the arrows. FIG. 12a assumes that the object 10 either comprises four permanent magnets 100a-100d or two magnetic coils 110a and 110b. The distance between the magnetic coils 110a and 110b or between the four permanent magnets 100a-100d is selected so that it corresponds to the distances of the regularly arranged magnetic coils 90. For example, the four permanent magnets 100a-100d are exemplarily arranged so that they are exactly opposite to corresponding four magnetic coils 90 in the position indicated in FIG. 12a. By a 90° rotation of the object 10 again such a situation results with other magnetic coils 90. In order to now generate the movement into the desired direction, the control means 18 as indicated by the arrows and their numbering, passes the activation of the magnetic coils 90 from those arranged below the permanent magnets 100a-100d or the coils 110a and 110b to those arranged offset to this in the desired direction, i.e. first of all those magnetic coils are excited to which the arrows with the number 1 are directed, then those to which the arrows with the number 2 are directed, etc. The excitation of the corresponding magnetic coils 90 of course depends on whether it is an object 10 with coils 110a and 110b or permanent magnets 100a-100b, wherein depending on the case, the excitation includes applying a voltage change to the corresponding magnetic coils 90 or applying a direct voltage as it was described with reference to FIG. 10a-10c, i.e. in the case of permanent magnets in the object 10 the excitation locations simply draw the object 10 behind the same, while in the case of magnetic coils in the object 10 the excitation coils are controlled temporally, so that the magnetic field decreases at the location of the magnetic coils of the object 10 leads to an attracting force in the desired direction (top right, FIG. 12a). Here, in the latter case already at a previous time the excitation coils 90 further at the front in the desired direction of movement were already, for example, controlled so that at the location of the magnetic coils of the object 10 a magnetic field increase resulted, which led to a repelling force in the desired direction (top right, FIG. 12a).

In FIG. 12b the same starting position is illustrated as in FIG. 12a, wherein, however, the control means 18 for leaving this starting position and for achieving a rotational movement of the object 10 excites other magnetic coils 90. How the excitation of the currently excited magnetic coils is changed to the next time is indicated in FIG. 12b again by the arrows with a number 1. As it is indicated, a counter-clockwise rotational movement results.

Figure 13A:
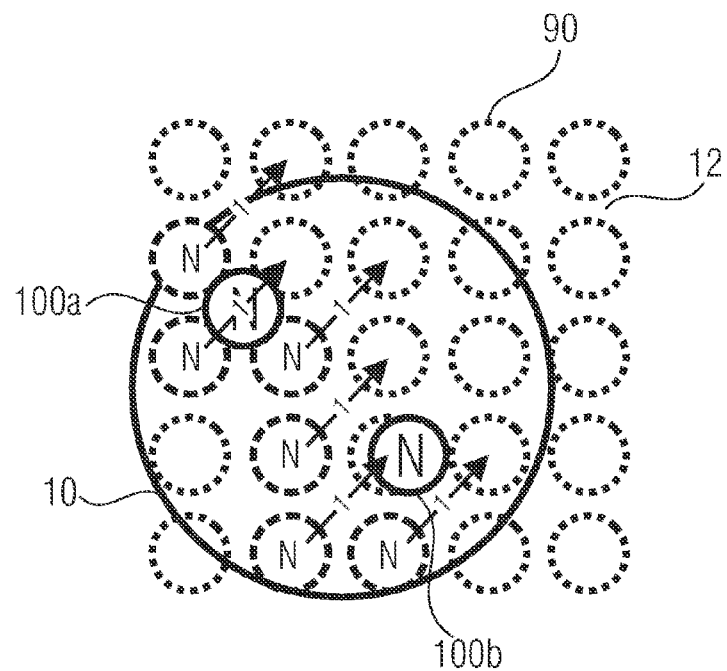
FIG. 13a,b show schematical top views as in FIGS. 12a and 12b, but using a magnetically repulsive mode of action.
Figure 13B:
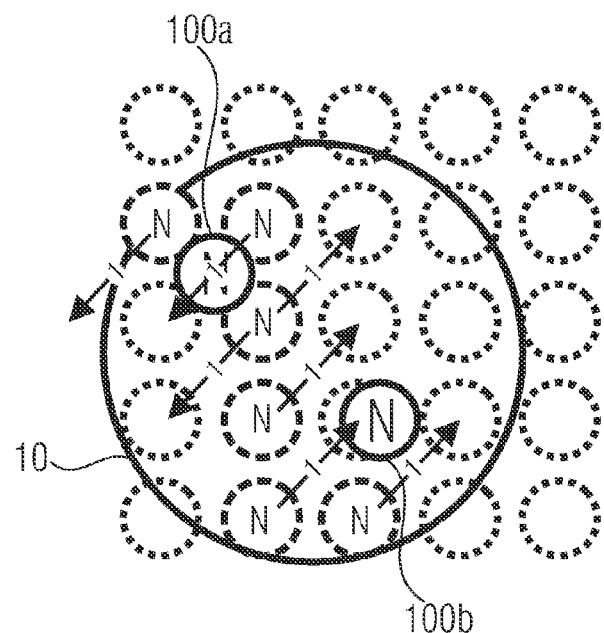

FIGS. 13a and 13b again refer to the case that was indicated in FIG. 10a, that is the movement of an object by using magnetic repulsion. In the case of FIGS. 13a and 13b the object only comprises two permanent magnets 100a and 100b as it was also the case in FIG. 11b. The magnetic polarity corresponds to that of FIG. 10a, i.e. excited magnetic coils 90 are poled in an opposite direction to the permanent magnets 100a and 100b. It is again indicated in FIGS. 13a and 13b in which direction the location of the excited magnetic coils 90 moves in order to "shift ahead of itself" the permanent magnets 100a and 100b.

Figure 14:
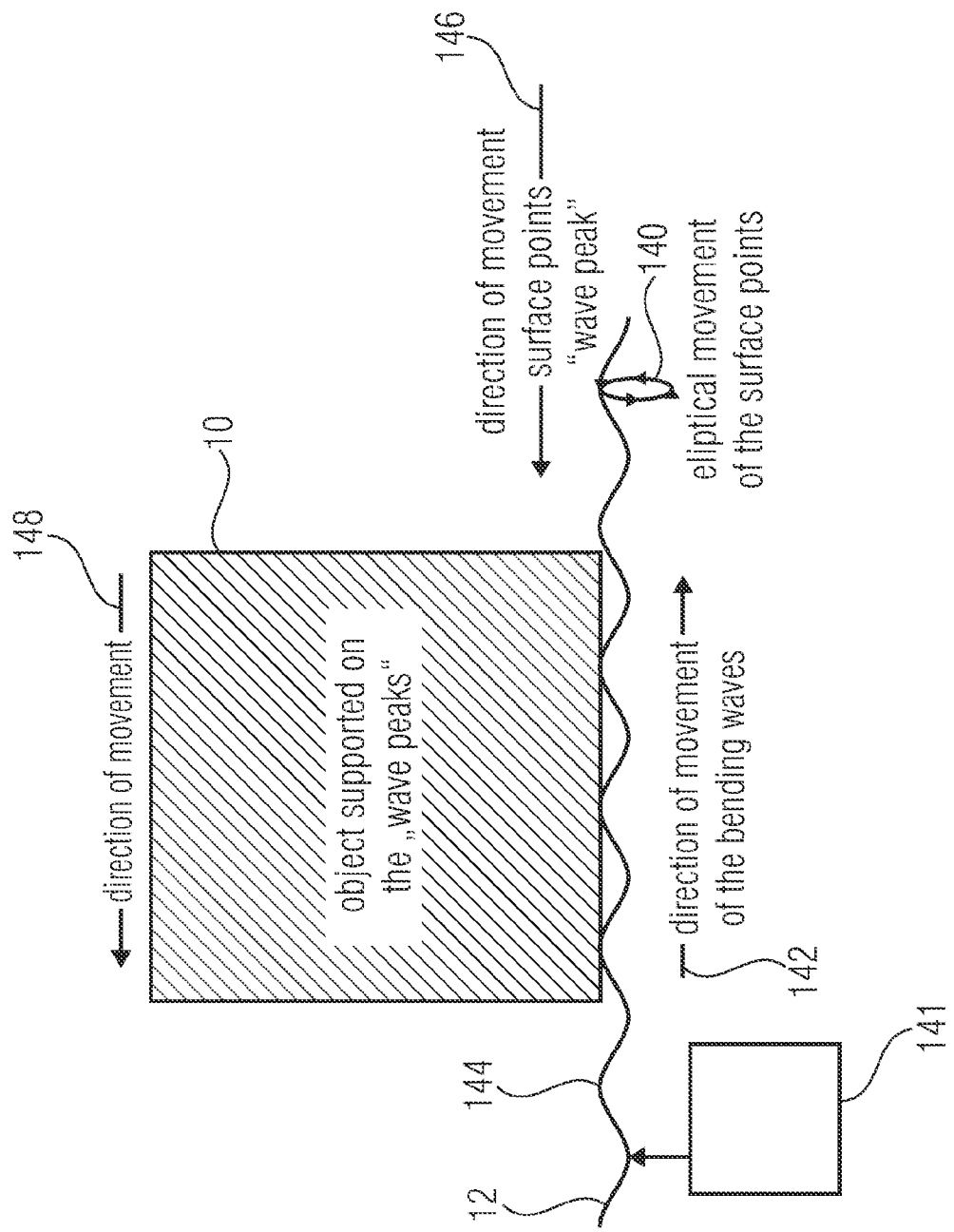
FIG. 14 shows a schematical illustration for illustrating the movement generation by means of surface waves.
Figure 15A:
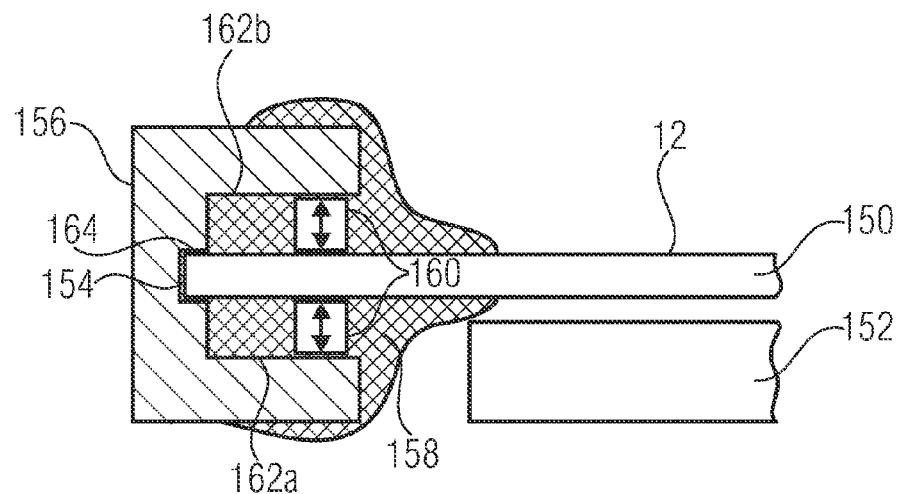
FIG. 15a,b show a sectional view and a top view of a bending wave generation means passing along a peripheral edge of a plate forming the transport surface according to an embodiment of the present invention.
Figure 15B:
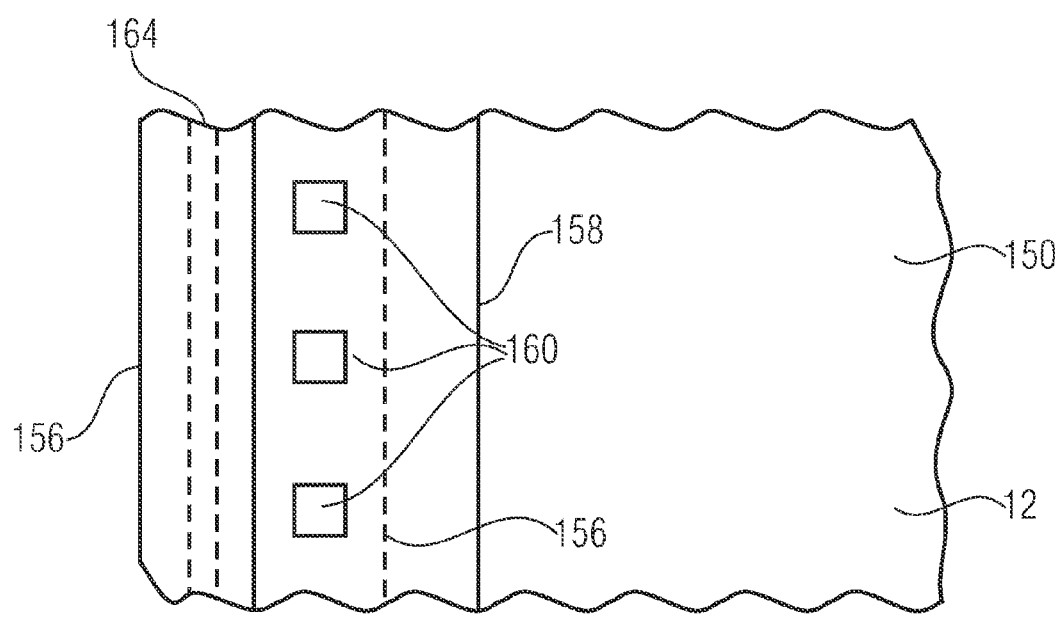

With reference to FIGS. 14-15b, in the following an embodiment for the means 16 for moving the object across the surface (FIG. 1) is described, according to which the means for motion generation generates bending waves or surface waves in the surface 12. The following disclosure thus represents an alternative for the magnetic lateral movement generation according to FIGS. 9a-13b and may only optionally be combined with a measure according to which an air cushion is used to reduce the weight of the object.

The principle on which this embodiment is based is illustrated in FIG. 14. A surface or bending wave propagating along the transport surface 12 which is generated by a bending wave generation means 141 causes an elliptical movement 114 of the surface points of the surface 12 when regarding their position over time. It is thus again noted that in FIG. 14 the state of the surface 12 at a fixed time is illustrated regarding its lateral extension, and for a special surface point 140 the course of its position is illustrated over time, i.e. by the ellipse and the arrows at 140. In case of FIG. 14, the direction of movement of the bending wave is along the arrow 142. As it may be seen, the surface points of the surface 12 move at the respective wave peaks 144 on which the object 10 is seated, i.e. the direction of line 140 at its topmost point, in a direction 146 which is opposite to the bending wave propagation direction 142. The object 10 which is at least mainly supported by the wave peaks 144 thus moves in the same direction 148 as the surface points at the wave peaks due to the bending waves, i.e. the direction 146.

According to the embodiment of FIG. 14, thus the means 16 for moving the object across the surface (FIG. 1) includes a means for generating bending waves in the surface 12. The control means 18 generates the bending waves so that as described in FIG. 14, the object 10 is moved into the desired direction. The control means 18 may in this respect use the known calculating methods from wave field synthesis in order to accordingly calculate the bending wave generation.

FIGS. 15a and 15b represent a possibility how bending waves may be generated in the transport surface 12. The transport surface 12 is formed by a plate 150 which is, for example, stiff and may be transparent which enables a combination with the following embodiments for a position determination means 14, according to which for position determination a screen 152 is used, which is already indicated in FIG. 15a. The plate 12 is held along its edge 154 by a carrier 156 which is u-shaped in cross-section, by a material which may serve as an adhesive and/or as a means for attenuating bending waves in the plate 50 occupying a spacing or gap between the carrier 156 serving as a retaining clip and the plate 150 and thus, for example, connecting the same mechanically and/or coupling or decoupling the same acoustically. Piezoelements 160 are applied to opposite sides of the plate 150 and extend to opposite interior sides 162a and 162b of the carrier 156 to be also applied there so that mechanical vibrations may be transferred to the plate 150 as undamped as possible in the surface normal direction to the plate 150 as it is indicated by the double arrows in FIG. 15a. The piezoelements 160 are, for example, arranged along the edge 154 of the plate 150 in a suitable exemplary equidistant distance to each other.

In the carrier 156, as illustrated in FIGS. 15a and 15b, a groove 164 may be provided along the direction of extension of the plate edge into which the plate 150 held by the attenuating material 158 projects, so that when exerting a force which is too high onto the plate 150 into the direction of the surface normal the piezoelements 160 or the attenuating material 158 are not damaged. In other words, the groove restricts the translational movements of the plates 150 in the direction of the surface normal around a resting position defined by the attenuating material 158 so that the piezoelements may not be damaged.

Of course, the groove 164 which is arranged further outside relative to the piezoelements 160 may be implemented so that it leaves no room between the plate 150 and its interior side, so that the groove 164 holds the plate 150. Depending on the circumstances, like e.g. the stiffness and the thickness of the plate, the latter solution may facilitate bending wave generation with a suitable frequency and amplitude.

It is, however, also noted that for the solution illustrated in FIGS. 15a and 15b, a plurality of alternatives exist, which relate both to the type of excitation, i.e. other drive mechanisms than piezodrives, like e.g. by electromotive drives, and also to fixing or non-fixing at the edge, bending wave attenuation at the edge for example by attenuating material or suitable shaping of the cross-section of the edge, the support of the plate, like e.g. by a bead instead of a groove and/or foam material, and the arrangement of the excitation means 160.

Although it is indicated in FIG. 15a that the piezoelements 160 are arranged on both sides of the plate 150, it is further possible that the piezoelements 160 are only arranged on one side like e.g. the side forming the transport surface 12.

By suitable precautions, reflections of bending waves in the plate 150 at the edge 154 may be prevented. For this, the plate 150 along its edge 154 is, for example, coated or the attenuating material 158 is suitably selected or the shape of the plate 150 comprises at its edge a tapering cross-section or the like to provide an anti-reflective edge termination in one or a combination of these ways.

Although it is not illustrated in FIGS. 15a and 15b, the plate 150 may, for example, comprise a rectangular or a square shape. Other shapes are also possible, like for example a round one or the like.

Finally, it is noted that the bending waves do not necessarily have to be formed in a plate. Possibly, surface waves may also be generated in a voluminous body whose one side serves as the transport plane.

After embodiments of the present invention were described for the means 16 for moving the object across the surface (FIG. 1), in the following, first of all with reference to FIGS. 16-25, a plurality of embodiments for the position determination means 14 (FIG. 1) are described, according to which the position determination means 14 comprises a display and an optical sensor in the object.

Figure 16:
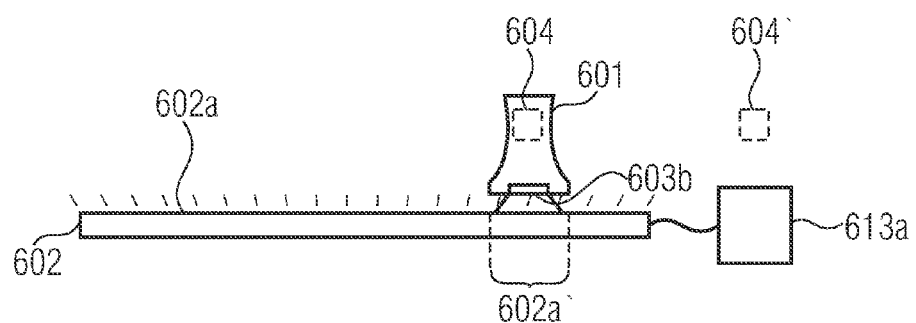
FIG. 16 shows a schematical sectional side view of a means for determining a position of an object on a display.

FIG. 16 shows a device for determining a position or location of an object 601 on a display 602. The device includes a control means 603a for controlling the display 602 such that the same displays laterally varying information at a front side 602a, and an optical sensor 603b for being accommodated in or at the object 601 for optically scanning a supporting surface 602a' of the front side 602a on which the object 601 rests or stands in order to obtain a sampling result with respect to the laterally varying information. Apart from that, the device includes a determination means 604, 604' for determining the position of the object 601 on the display 602 depending on the sampling result, as indicated in FIG. 16 by dashed lines, arranged in or at the object and/or outside the same and separated from the same.

As it will be explained in more detail in the following embodiments, there are different possibilities for the laterally varying information which the display 602 displays upon a control by the control means 603a. For example, the display means 603a may control the display 602 to sequentially request potential locations or positions of the object 601 on the display 602 by controlling the display 602 such that the same displays an optical spatially limited characteristic differentiable from a current screen background of the display 602, like, for example, a fully illuminated pixel, a switched-off pixel or a flickering pixel which displays the laterally varying information sequentially at the different positions at the front side 602a. In this respect, the characteristic, for example, scans the complete screen 602 in a zigzag way like for example line after line. On the basis of a synchronization between the sequential display of the characteristic at the potential locations on the one hand and the determination means 604 or 604' on the other hand, the determination means 604 or 604' may conclude the position of the object 601 on the display 602 from a temporal relationship or ratio between the sequential display of the characteristic on the display 602 on the one hand and the time when the optical sensor 603b detects the characteristic, i.e. at the time when the characteristic is located within the supporting surface 602a'. If the determination means 604 or 604' is arranged externally to the object 601, as it is indicated at 604', then the common time base or the synchronization between determination means 604' and control means 603a may be executed in a simple way, for example, by a common timing. This case is explained in more detail in the following with reference to the following figures. It would, however, also be possible that the determination means in the object 601 is only informed by the control means 603a with respect to the beginning of the sequential display of the characteristic which then passes through the possible locations or positions in a predetermined speed, for example, cyclically. For maintaining the synchronization, a further comparison may be provided. It is further possible that the determination means 604 or 604' and the control means 603a cooperate so that the brightness value detected by the optical sensor 603b after each shifting of the characteristic to the next potential location is actively queried, whereupon first the characteristic is further shifted and the next brightness value is queried, etc.

Apart from the above-mentioned possibility to sequentially or even cyclically query the possible locations of the object 601 by sequentially passing these locations and sequentially indicating a characteristic at these locations, there is a further possibility for determining the location by the display means 603a controlling the display 602 such that the same displays a binary subdivision refining step by step which enables to localize the object 601 in n steps with an accuracy which corresponds to a $2^{-n}$-th of the extension of the display 602. For example, the display means 603a halves the extension of the display 602 first into two halves by displaying something different in one half than in the other half or by overlaying in one half the screen background with something different than in the other. Based on the sampling results by the optical sensor 603b the determination means 604 may determine in which half the object 601 is located, whereupon it again halves this half in the next step in a corresponding way and determines based on the new sampling result in which screen quarter of the screen 602 the object 601 is located, etc. In case of several objects on the display 602 it is also possible that the control means 603a again halves all current areas in which an object is located in a certain step, which is why a localization of several objects in the same resolution is possible simultaneously by the above-described stepwise refining binary subdivision. Also this type of localization is explained in more detail in the following embodiments. A common time base between the determination means 604 or 604' and the control means 603a so that the determination means may allocate the sampling result of the optical sensor 603b to the right step in the stepwise refining binary subdivision, may be executed like in the previous scanning query of the display screen, like, e.g. by querying the one or several brightness values per step.

Finally, it will be possible for the control means 603a to control the display 602 such that the same displays laterally varying information which varies laterally such that using a section of this information with an extension corresponding to that which is scanned by the optical center 603b, the place within the display 602 may be uniquely concluded. An example for this would be a checkered pattern on the display 602 whose interval width changes strictly monotonously, from one corner up to an opposing corner of the display 602. In this case no synchronization or no common time base is needed between the determination means 604 and the control means 603a.

One advantage of accommodating the determination means 604' outside the object 601 is that the requirements regarding the performance to be provided for each object 601 to be localized is lower. In case of a wireless transmission from the optical sensor 603b to the determination means 604' it may, for example, be the case that the brightness information detected by the optical sensor 603b are directly transferred to the determination means 604' which thereupon examines the same regarding the laterally varying information displayed on the display 602. It is further possible, however, that a part 604 of the determination means located in the object 601 already executes a preprocessing of the pure brightness information of the optical sensor 603b to transmit information extracted from the brightness information to the other part 604', like, for example, a time of occurrence of a characteristic sequentially passing the display 602 in the area of a supporting surface 602a. Different further possibilities are explained in the following.

After now above a device for determining an object on a display was coarsely explained, in the following with reference to FIGS. 17-20 a game device is described like, e.g., for chess or the like, where a game piece or several game pieces are localized on a display of the game device so that the following disclosures, so to speak, also represent a possible application for the device described in FIG. 16. Although in the following such a game device is described, the position determination as it is used here for the game piece may also be applied in other applications for corresponding objects, as it will be explained after the description of the figures of FIGS. 16-20.

Figure 17:
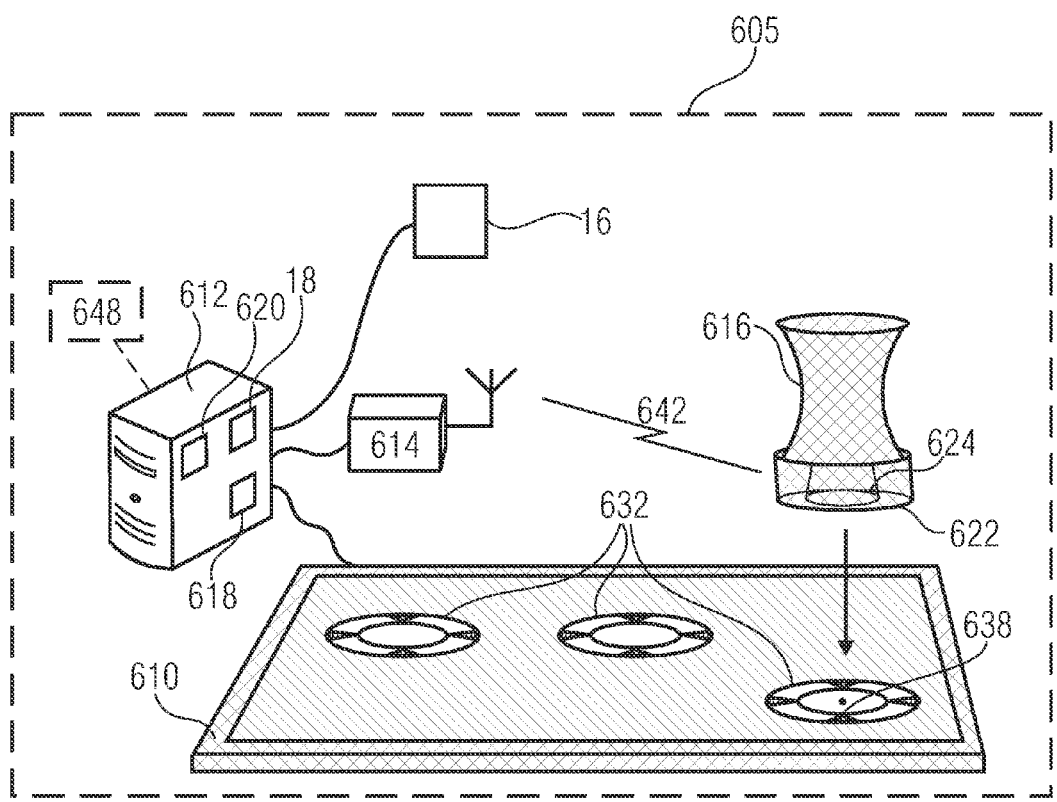
FIG. 17 shows a schematical illustration of a game device having a game piece position determining functionality according to an embodiment.

The game device of FIG. 17, generally designated by 605, includes a display 610, a computer 612, a receiver 614 and a game piece 616. The computer 612 is connected to the display 610 and includes a control means 618 for controlling the display 610, like e.g. a graphics card of the computer 612, and a processing means 620, like e.g. a CPU of the computer 612 in connection with a program executed on the same which is responsible for the game functions of the game device 605, as it is explained in detail in the following. The computer 612 or the processing means 620 is further connected to the receiver 614.

The game piece 616 comprises a floor space 622 which is provided to be supported on the display 610 during the game and thus cover a part of the screen content of the display 610, i.e. the supporting surface.

In the interior of the game piece 616 a transmission means 624 is located which communicates with the receiver 614 and is further able at a time at which the game piece 616 is placed on the display 610 to detect a part of the screen content located below the floor space 622.

The game device further has the capability to move the game piece without user interaction, wherein in this respect the computer 612 or the processing means 620 for example also takes over the function of the control 18 and has a moving means 16 coupled via the control 18 to the position determination means wherein the latter is formed by the display 610, the processing means 620, the control means 618 and the optical sensor in the object 616.

Figure 18:
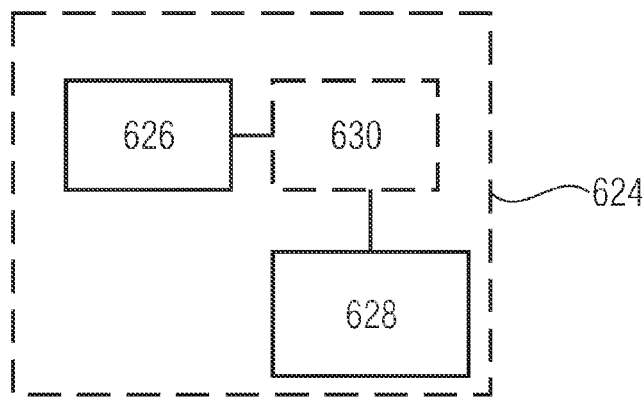
FIG. 18 shows a schematical illustration of a setup of a transmission means from FIG. 17.

As it is illustrated in FIG. 18, the transmission means 624 in particular includes a transmitter 626 which is able to transmit a response signal to the receiver 614, which is explained in more detail in the following, and an optical sensor 628, like e.g. a photo cell or a photo array which is aligned so that it detects radiation or light impinging upon the floor space 622. Apart from this, the transmission means 624 may further comprise a processing means 630 via which the transmitter 626 is coupled to the optical sensor 628, wherein, however, alternatively also a direct coupling between the transmitter 626 and the optical sensor 628 would be possible.

After the individual components of the game device 605 were described above, in the following, with reference to FIG. 19, the functioning of the game device during a game is described. The game may, for example, be chess or the like, wherein, however, the following disclosure with reference to FIG. 19 is limited to describing the functionality of the processing means 620 in connection with the determination of the position of the game piece 616 on the display 610 which the processing means 620 then, for example, uses to plot game moves, determine game moves of a computer opponent or the like.

Figure 19:
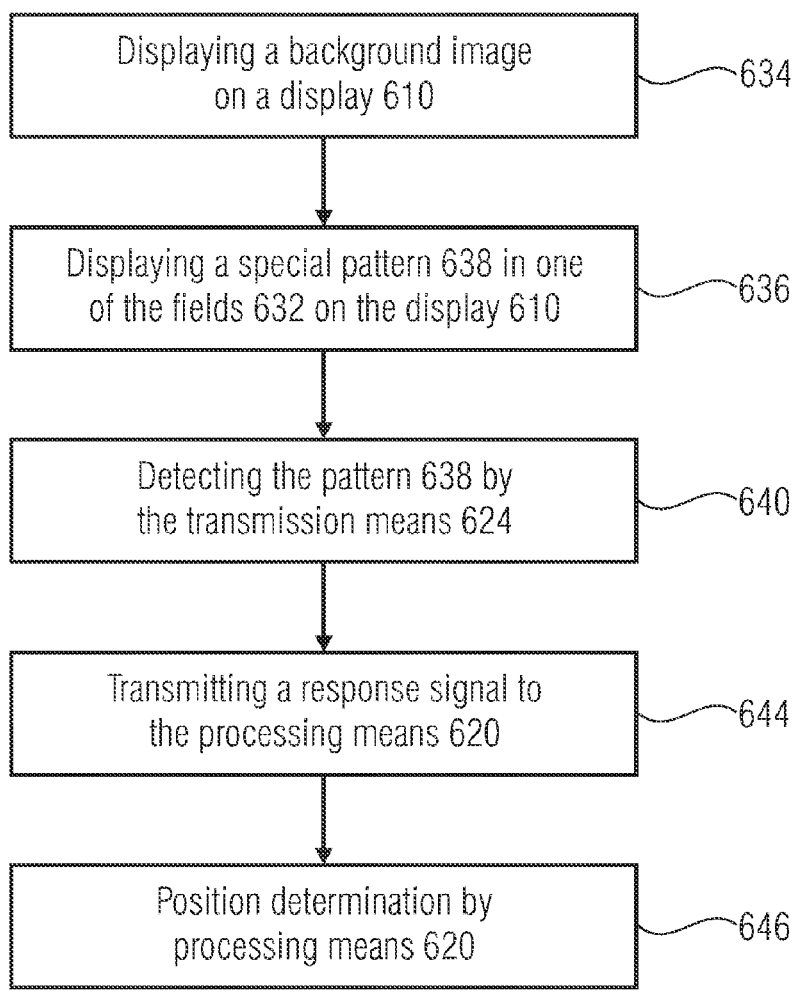
FIG. 19 shows a flowchart for illustrating the functioning of the game device of FIG. 17 according to one embodiment.
Figure 20:
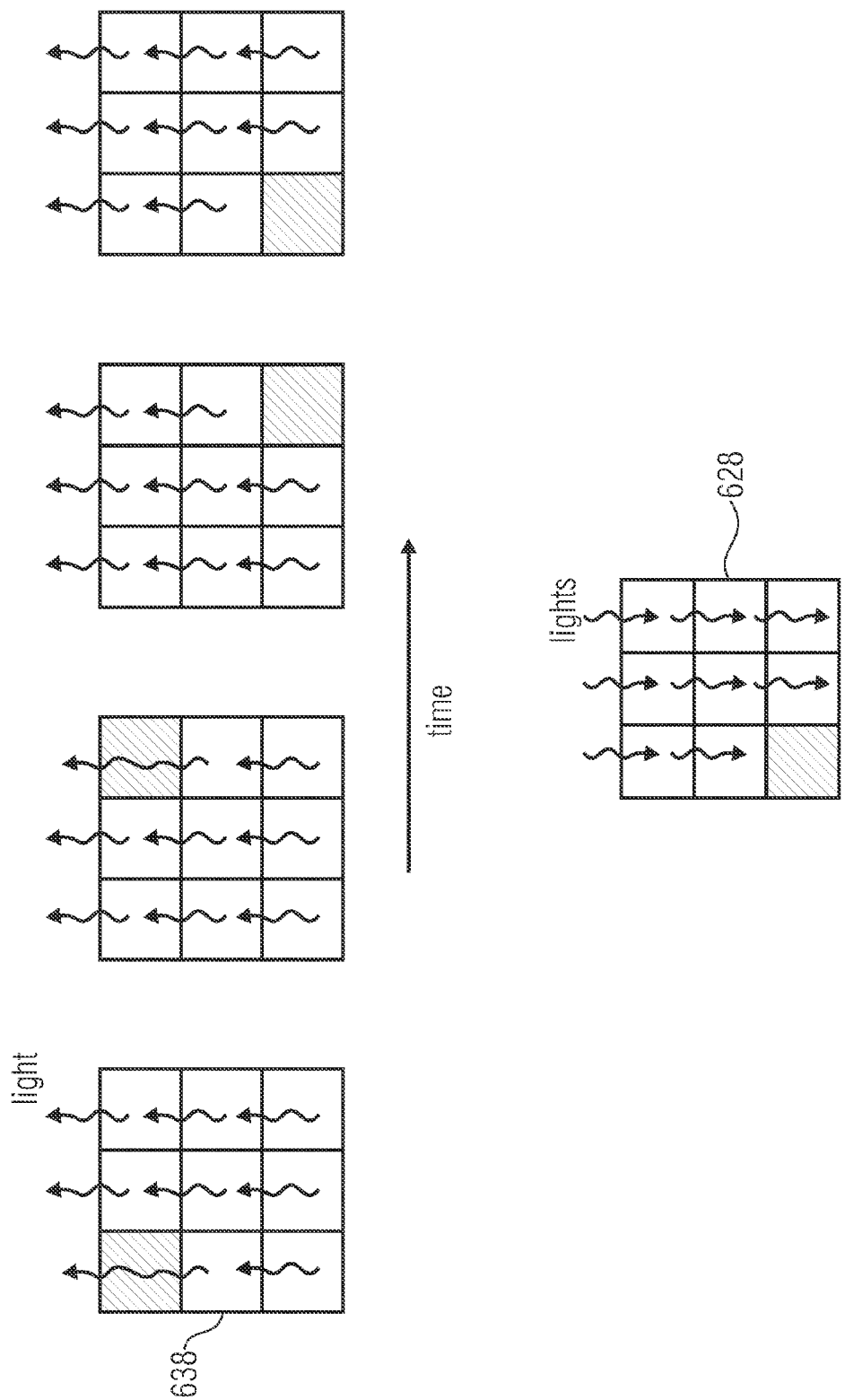
FIG. 20 shows a schematical illustration of possible patterns for detecting the position and the orientation of the game pieces in FIGS. 17 and 18 on a display.

In its basic state, i.e., in an initial state of the method according to FIG. 19, the processing means 620 causes the control means 618 to control the display 610 so that the display 610 displays a game field. The processing means 620, thus, is knowledgeable about a game field represented on the display 610. In FIG. 17, as an example, a game field is illustrated comprising three game field 632 upon which the game piece 616 may be placed according to game rules. Displaying the background image is executed in step 634. Thereupon, the control means 618 controls the display 610 so that the background image or the game board is overlaid by a special pattern at the possible game fields 632, wherein the pattern clearly stands out from the background image. In particular, the control means 618 controls the display 610 in step 636 such that the game field 632 are passed one after the other and, for example, cyclically, to each display sequentially, one after the other, the special pattern. The display of the pattern in the respective game fields 632 may, for example, be limited to a partial area 638 in the interior of the game fields 632, such as, e.g., to a pixel of the display 610. The special pattern may be different from the remaining background representing the game board in terms of a special color or a temporal variation regarding brightness or color, wherein in the following different embodiments are provided in this respect.

During step 636, the optical sensor 628 of the transmission means 624 continuously scans the portion of the screen content of the display 610 which is located below the floor space 622 of the game piece 616. As soon as the special pattern is displayed in step 636, in the game field 632 on which the game piece 616 is placed, then at the output signal of the optical sensor 628, the special pattern for the processing means 630 may be detected. After detecting the optical pattern by the processing means 630 in step 640, the processing means 630 causes the transmitter 626 to send out a response signal to the receiver 614 via the contactless interface 642 (step 644). The receiver 614 passes the response signal on to the processing means 620. At the time of receiving the response signal, the processing means 620 is further informed about the game field 632 in which in step 636 the special pattern is displayed. Considering a possible temporal offset between the display of the special pattern in the respective game field 632 and the receipt of the information of sending out the response signal by the transmitter 626, the processing means 620 then determines the position of the game piece 616 on the display 610 in step 646.

Transmitting the response signal via the contactless interface 642 is, for example, possible by means of using the RFID technology (radio frequency identification). Further, however, a (not indicated in FIG. 17) wire bonded transmission by the transmission means 624 to the processing means 18 is possible.

If the signal transmitted in step 644 by the transmitter 626 is designed such that it contains a unique identification number, then in step 646, apart from position determination of a piece, a unique identification of the piece among a plurality of game pieces may also be executed. This enables games, such as, for example, chess in which game pieces have a different meaning and, thus, the processing means 620 should be able to differentiate the same.

In case of a chess game, a unique identification number may, for example, be an identification number between 1 and 32 in order to differentiate between the 32 chess pieces.

As at any time of the game the processing means 618 knows the position and type of the game pieces 616 located on the display 610, a fast "copying" of a special game situation is possible without first having to "play up to" this situation from the chess starting position.

If the computer 612 or the processing means 620 is further connected to a data interface 648 (such as, e.g., a modem or a network connection), then the processing means 620 may transmit the position and the identity of all game pieces and, if applicable, the background represented on the display 610 to an external device. Further, if the processing means 620 is designed such that it may also receive data from the data interface 648, in this way a team player mode may be reached. For example, in a chess game two players may play against each other wherein their processing means 620 are networked by means of the data interface 648 via the internet. Each player would only move his own pieces. The pieces of the player connected via the network would be moved by the local computer by means of means 14, 16 and 18. For example, with a move of the first player, the new position of a currently moved game piece 616 under game board represented by the display 610, as described in FIG. 19, would be detected locally. The processing means 620 would then report the new position of this piece to the corresponding processing means 620 of the second player by means of a data interface 648 via the internet, which, in turn, would cause the control means 618 to control the moving means so that on the display 610 of the second player the moved game piece 616 (for example, bishop, pawn, etc.) takes on the new position. Thereupon, the second player may register the new game situation and plan his next move which, after it is performed, would again be reported to the first player according to the above method. The game 605 may, thus, be used as a chess game in which you can play against the computer but also against another spatially separated player and wherein the enemy pieces automatically move. The processing means 620 may also check compliance with game rules and inform the player (in case of a game against a computer opponent) or the players (in case of a game in a team player mode) when an action is performed which does not comply with game rules.

Although in the above example of the chess game, the team player mode naturally includes only two players, it is also possible to play games with the game device 605 in which several players compete with each other, such as, for example, the game "Mensch-Ärger-Dich-Nicht" (comparable to the Ludo board game).

A further embodiment is to illustrate the implementation of games, such as, for example, strategy games in which not only the determination of the position and the identification of the individual game pieces is of decisive importance but also the orientation of the figures on the game board. The information of the orientation of the pieces which is of strategic importance for some games, such as, for example, the advance, retreat or pincer movement of military troops, may be detected using the device and the method as, for example, described in FIG. 5. The pattern 38 sequentially illustrated in every field of the display 10 would, for example, include 3×3 pixels. The determination of the position of a game piece 16 and the identification of this game piece 16 may be executed like in the above embodiment of the chess game. The orientation determination of the game piece 16 may now, for example, be executed so that in four temporal steps each one corner pixel of the pattern 38 would be switched off (the corner pixel would not be illuminated) and, thus, not be detectable by the optical sensor 28 of the transmission means 24.

The corresponding optical sensor 628 at the transmission means 624 would then be set up such that a corner pixel of the field which also 3×3 pixels large would be an empty or "blind" panel (i.e., not capable of being scanned). In each of the four temporal steps, the processing means 630 accommodated in the transmission means 624 checks the number of dark (i.e., not illuminated) corner pixels detected by the optical sensor 628. In one of the four temporal steps, the switched off corner pixel of the pattern 628 coincides with the "blind" corner pixel of the optical sensor 628, i.e., only one corner pixel is detected as being dark. At the end of the four temporal steps, the processing means 630 causes the transmitter 626 to transmit a response signal to the processing means 620 which contains information in which of the four temporal steps only one dark corner pixel was registered. If the processing means 620 knows the position of the blind pixel at the optical sensor 626 with reference to the Fig. (e.g., "left rear"), from this response signal an orientation determination of the game piece 616 would be possible, as the processing means 620 obtains unique orientation information of the game piece 616 from knowing the four temporal steps when displaying the pattern 628 and the information in which of the four temporal steps only one dark corner pixel was registered. This type of detection would enable four orientation directions of the game piece 616, i.e., "directed forward", "turned to the right", "turned to the left" and "directed backwards". A possible finer "pixelization or blurring" of the pattern 638 and the optical sensor 628 would, for example, enable an even more accurate determination of the orientation of the game piece 616.

Alternatively, it would also be possible to determine the orientation of the game piece 616 by the transmission means 624 reporting the pattern 638 detected by the optical sensor 628 to the processing means 620 as a response signal. The processing means 620 might then determine the orientation of the game piece 616 from this response signal and using its knowledge regarding the orientation of the pattern 638 on the display 610 by detecting that the image of the pattern 638 contained in the response signal is "upside down", for example.

Although the transmission of the response signal in step 644 was triggered by detecting the pattern 628 by the optical sensor 628, it is also possible that the transmission means 624 permanently transmits the image detected by the optical sensor 628 and a unique identification number to the processing means 620. The processing means 620 then, for example, causes the control means 618 to cyclically represent the pattern 626 in one of the fields 632 each. In this case, the position determination of the object 616 is executed by the processing means 620 registering when the image transmitted by the transmission means 624 contains the pattern 626 and, thus, a unique position determination of the object 626 in the field 632 is possible in which the pattern 626 is generated.

As already mentioned above, the processing means 630 may be missing in case the measured value of the sensor 628 is sent out, wherein the measured value may be a number which depends on the light incidence onto the sensor 628. Of course, the processing means may determine another value from this number before sending out by quantization or threshold value comparison, wherein this value is then sent out to the determination means. In case of a sensor having several pixels, for example the measured values of all pixels are transmitted to the determination means at one point in time. The processing means 630 may also determine, for example, a scalar value from the several measured values of the pixels by preprocessing, which is then transmitted to the determination means as a response signal.

Although only devices and methods are described above, in which the processing means 620 causes the control means 618 to sequentially display a pattern 638 in one of the fields 632 each, it is also possible that different uniquely differentiable patterns 638 are displayed simultaneously in each of the fields 632 on the display 610. A position determination of the object 616 is then possible by the transmitter 626 continuously transmitting the image detected by the optical sensor 628 to the processing means 620, which then determines from a comparison of the received image and all patterns represented in the fields 636 the position of the object 616 in the field 632 in which the displayed pattern 638 corresponds to the image contained in the response signal. Here, alternatively, also rotations of the transmitted image may be considered by the processing means 620 to obtain a match of the image with a pattern represented on the display 610.

In the above discussion of FIGS. 16 to 20, the processing means 620 served as the determination means 604' of FIG. 16 and the processing means 630 took over tasks of the determination means 604 of FIG. 16.

It is again explicitly noted, that it is not necessary for the optical sensor 603b or 628 to comprise a lateral resolution. The optical sensor may comprise only one pixel and, thus, determine for each point in time only one brightness value including and excluding color information. In particular, the optical sensor may be implemented as one single photodiode. An array of photodiodes is not necessary. This will be explained again in the following embodiment which refers to a game with several game pieces and is explained with reference to FIG. 17. For example, in this embodiment, all game pieces 616 comprise a passive or a semi-passive RFID sensor including means 626 and, if applicable 630, and to which one single photo sensor is connected, such as a photodiode 628 which, for example, comprises a light sensitive area which is larger than a pixel of the display 610 regarding its dimensions. As the game pieces in this exemplary case are only provided with photo diodes which may be of a relatively large size, the costs for the game are less than in case of an array of photo diodes in the respective game pieces 616.

Figure 21:
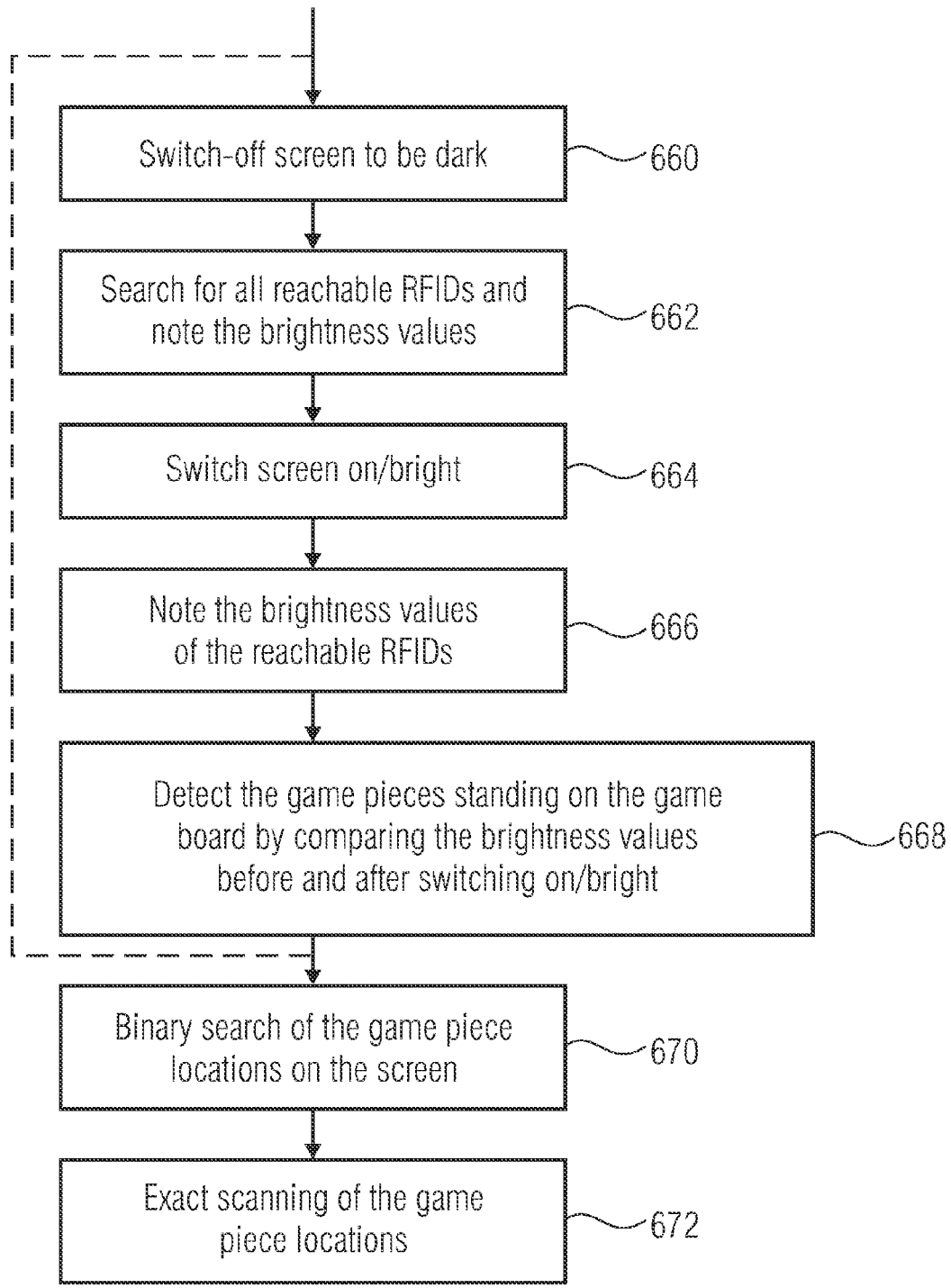
FIG. 21 shows a flowchart for illustrating the functioning of the game device of FIG. 17 according to a further embodiment.

In this game scenario, the device of FIG. 17 executes the method according to FIG. 21, for example, in order to localize the game pieces on the display 610 and, if applicable, determine their orientation. As illustrated in FIG. 21, the method starts by the processing means 620 instructing the display 610 in the computer 612 via the control means 618 to switch the screen off so that it becomes dark (step 660). Thereupon, the processing means 620 searches for all reachable RFIDs 624 or all reachable game pieces 616 via the transmitter/receiver 614 and notes or stores the status or the brightness value of the respective photo sensors 628, i.e., whether the photo sensor of a respective reachable game piece, e.g., sees dark or light at the time of query (step 662). Depending on the RFID technology which is, of course, only an example for a wireless communication 642, for example 100 to 1000 RFIDs and thus, 100 to 1000 game pieces per second may be findable for the processing means 620. The result of step 662 is a list of all game pieces located in the proximity of the receiver 614 independent of whether they are positioned on the game board or the display 610 or not.

Thereupon, the processing means 620 of the computer 612 switches on (bright) the display 610 (step 664) via the control means 618 and searches again all reachable RFIDs 624 in a subsequent step 666 or at least notes the status of the photo sensors 628 of the reachable RFIDs 624 in step 666. From the two brightness values for each reachable RFID 624, the processing means 620 is able to detect those gain pieces 616 where the status or the detected brightness value of the respective optical sensor 628 changed by more than a predetermined measure. This comparison of brightness values before and after switching on or bright in step 664 is executed by the processing means 620 in step 668. The result of the step 68 is the game pieces positioned on the game board or the display 610, as it is to be assumed that the game pieces whose sensor status changed are placed on the display 610 while the other game pieces are not placed on the display 610 or the game board.

Possibly, steps 660 to 668 may be repeated one or several times in order to increase the security of detection in step 668, wherein searching or noting in steps 662 and 666 may, for example, be restricted to the already known RFIDs. All in all, i.e., with or without repetition, steps 660 to 668 are, for example, executed within a maximum of two seconds.

Figure 22:
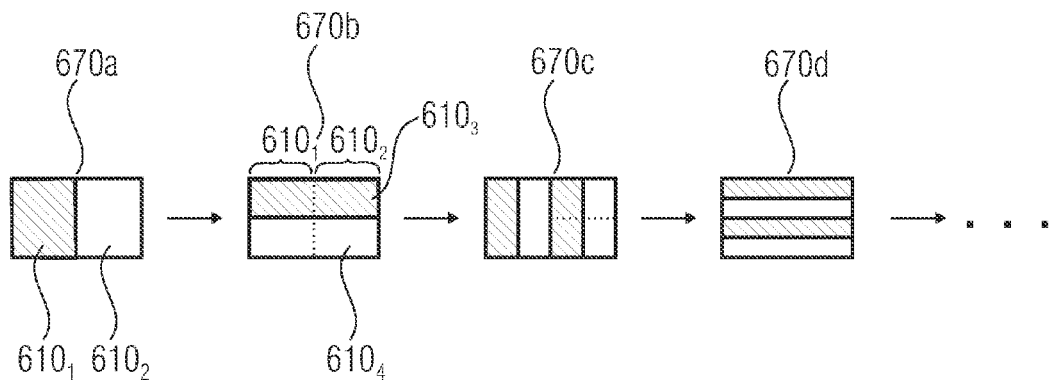
FIG. 22 shows a schematical illustration of a sequence of screen displays used step-by-step in the binary search within the method according to FIG. 21.

Thereupon, the processing means 620 in the computer 612 causes the display 610 to be halved step by step via the control means 618 by the same, for example, first of all switching one half 6101 to be dark and the other half 6102 of the display to be bright, in a next step, again, switching one half 6103 to be dark and the other half 6104 to be bright within the two halves and in a subsequent step, again, dividing the defined quarters 6103, again, in a dark and a bright half, etc. One possible sequence of screen displays which are displayed one after the other in the individual steps on the display 610 is indicated in FIG. 22, in the order from left to right with the only four represented exemplary individual partial steps 670a, 670b, 670c, 670d. While the processing means 620 executes this binary division in step 670, it records for each partial step of step 670 whether the respective optical sensor 628 indicates that the game piece is positioned on the bright half or on the dark half of the screen. This way, the processing means 620 executes a "binary search" of the locations of the game pieces 616 in step 670. On the basis of the recorded or logged response or feedback of the game pieces 616 or the logged brightness values for the individual partial steps 670a, 670b, 670c, 670d, etc., of the binary search 670, the processing means 620 then concludes the positions of the individual game pieces.

Alternatively, it is possible for the processing means 620 in step 670 to execute the binary search for determining what game piece is located where with ever smaller light areas, i.e., by first switching one half, then one quarter, then one eighth etc. of the screen bright or dark and then checking what game pieces then report bright or dark. As for each field, ever less and known figures have to be searched and, thus, only areas have to be processed more accurately on which pieces are located, the binary search in step 670 is not very time consuming.

As it may be seen from FIG. 22, the area division into bright and dark areas in each partial step in the binary search 670 becomes ever smaller. In particular, it is possible that this division becomes as small as the pixel resolution itself. In particular, the division may become so fine that the individual light areas in one partial step are smaller than the optical sensors 628 of the game pieces 616, i.e., smaller than the floor space or footprint of the pieces 616, so that the processing means 620 may determine also the edges of the pieces 616 and, in particular, the edges of the light sensitive areas of the corresponding optical sensors 628 from the logged responses or brightness values for the individual partial steps 670a to 670d.

The result of step 670 is, thus, the locations of the game pieces 616 which are located on the screen 610.

In a subsequent step 672 it may now be the case that the processing means 620 at each location of a game piece of step 670 executes an exact scanning of photo sensor extent of the optical photo sensors 628 of the game pieces 616 located on the screen 610. Scanning, for example, provides scanning by only one pixel or one light point. For example, a mask with a suitable geometrical pattern is placed in front of the photo sensor 628 of each game piece 616, wherein the pattern may only be transferred into its original form by a rotation in the screen plane by more than 90° or, for example, only by a rotation of 360°, for example. In this case, by scanning in step 672 possibly not only the position but also the direction of the piece 616 may be determined into which the respective piece is aligned or directed. For example, the RFIDs 626 of the game pieces 616 may be addressed or queried separately and with a high frequency via the transmit/receive means 614. For example, more than 100 read operations per second are possible, so that the exact scanning in step 672 may take place fast and imperceptible for the user. In particular, the exact scanning in step 672 is, for example, limited to the game piece locations. The effort of the corresponding pattern recognition for a lateral resolution of the mask may, as described above, be shifted to the computer 612 or the processing means 620 by the sensors only transmitting the brightness values. The game pieces 616 only need the mask or correspondingly shaped photo sensors 628. Round photo sensors or round masks are possible if no orientation of the game pieces has to be detected in the respective game.

Figure 23:
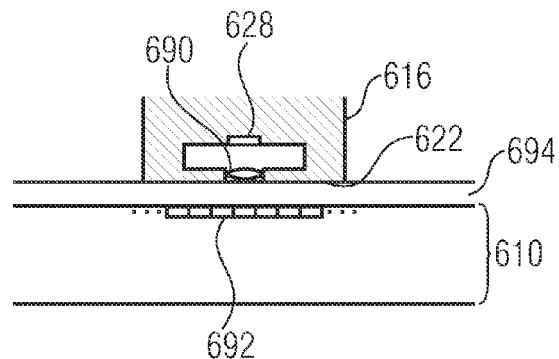
FIG. 23 shows a sectional view of a bottom part of a game piece arranged on a display according to an embodiment.

It is illustrated in FIG. 23, that the game piece 616 possibly may also comprise a lens 690 at its floor space 622, e.g. a plastic lens, which maps the pixels 692 of the display 610 onto the optical sensor 628 or the mask (not illustrated) of the same for improving the optical characteristics. For example, the lens 690 bridges a distance between the floor space 622 and the pixels 692 of the display 610 which is defined by a protective screen 694 which is located between the screen or the display 610 and the game piece 616 for protecting the screen 610 from mechanical damages or the like and is otherwise transparent. By using the lens 690 in this way also a negative effect of dirt on the floor space 622 of the game FIG. 616 may be reduced as then the dirt would not be located in the object plane but close to the lens plane.

Of course it is noted that the embodiment described with reference to FIGS. 21 to 23 may also be executed so that the above-described pattern recognition is executed within the game pieces, i.e., within the processing means 630.

It is finally noted that it is possible to track game pieces or one game piece on the display 610 during a movement of the same across the display 610. For this purpose, the game pieces or the object is, for example, scanned with a sufficiently high frequency. In this way, both shifts from the central position and also twists maybe detected. In this way, the game pieces may be tracked while they are moved across the game field or the display 610 by the user.

Figure 24:
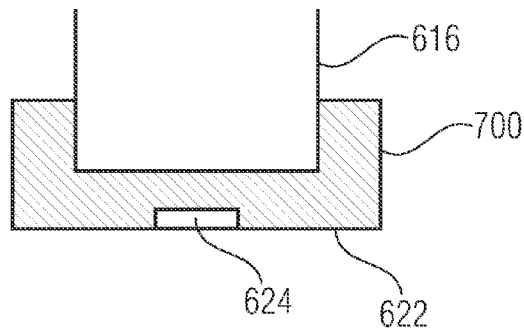
FIG. 24 shows a schematical sectional view of a base with a transmission means for mounting to a bottom side of a game piece according to one embodiment.

Further, finally FIG. 24 should explicitly show that it is possible that the transmission means 624 may be provided not to be connected firmly to the actual game piece 616 but still to be attached to the same. According to FIG. 24, the transmission means 624 is, for example, arranged in a base 600 into which a game piece 616 may be inserted, screwed or be mounted in another way. FIG. 25 finally shows a top view of one possible arrangement of a panel 710 which covers a light sensitive area of the optical sensor, e.g., a photo cell 628, and comprises an opening 712 which determines the effective light sensitive area of the optical sensor 628, as only through the same light from the display may impinge on the sensor 628. Apart from this, it is shown as an example that the extent of the latter area 712 may be larger than the pixels which are illustrated at 714 representing all pixels. Of course it would also be possible that the sensor itself is implemented in the shape 712, wherein in this case a panel maybe omitted. The panel illustrated in FIG. 25 enables the above described exact position and orientation determination, for example by scanning the region around the opening 712 with a characteristic which is only one pixel 714 large, such as a pixel alternating between bright and dark. In this way, the determination means may determine all those pixels 714 which overlap the field 712 by more than a predetermined extent. The response signal transmitted by the sensor 628 via the transmitter to the determination means is, for example, binary and indicates whether the detected brightness value exceeds a predetermined measure corresponding to the predetermined extent of overlap at a time, like e.g. the current time of querying. Of course, the response signal may also indicate the brightness value in more exact stages.

In the previous description of FIGS. 16 to 25, the existence of the moving means 16 and the control means 18 was indicated only schematically. That the embodiments described above with reference to FIGS. 2 to 16 are very suitable for being combined with the embodiments according to FIGS. 16 to 25 is illustrated in the following again with reference to FIGS. 26a to 26b which illustrate embodiments regarding how the display of the position determination means according to the embodiments of FIGS. 16 to 25 may be combined with or arranged relative to the previous embodiments for the moving means 16.

As already described above, it is possible to manufacture a plate having individually controllable nozzle valves according to the embodiments of FIGS. 2 to 8 in a transparent or translucent way. These embodiments may, thus, according to FIG. 26a, be combined with those of FIGS. 16 to 25 by such an air valve plate 800 being arranged on top of a display 802 which may, in turn, include a cover plate 804 and corresponds to the display of the embodiments of FIGS. 16 to 25. Between the air valve plate 800 and the display 802 a gap 806 is provided which serves as a pressure chamber in which the compressed air is discharged through the activated air valves in the plate 800 at the transport surface 12. The transparency of the plate 800 guarantees that the image generated by the pixels 808 of the display 802 is visible for a viewer through the cover plate 804 which is, of course, also transparent, and through the pressure chamber 806 and though the air valve plate 800 whose side facing away from the display 802 forms the transport surface 12. The above mentioned optical sensor in the object may, in the exemplary case of the implementation of the floor of the object according to FIG. 3 or 8, detect in one of the recesses, e.g., in the central recess, the laterally varying information which is indicated by the display 802 and, if applicable, pass on the scan results via the transmitter.

A corresponding cross section of a possible object or a possible game piece is illustrated in FIG. 26, wherein the arrangement of the optical sensor according to FIG. 23 is only an example.

FIG. 26 shows that a combination of the embodiments 2 to 8, 9 to 13*b* and 16 to 25 is also possible. The display 802 is again separated by a pressure chamber or a pressure gap 806 from the air valve plate 800 whose front side forms the transport surface 12. On the side of the display 802 facing away from the air valve plate 800, a magnetic coil plate is located which may be implemented according to FIG. 9*a*. Objects hovering on air cushions may, thus, be handled by means of the magnetic drive as it is generated by the magnetic coil plate 810, wherein the position is determined via the position determination means using the display 802.

As already indicated in FIG. 15*a*, it is possible to combine the embodiments of FIGS. 16 to 25 with the embodiment of FIGS. 14 to 15*b* by arranging the display simply below the bending wave plate. However, it is noted here that it should be possible to also generate bending waves in a glass plate which, according to the embodiment of FIGS. 6*a* and 6*b*, comprises holes for the air valves, wherein in this case and in this way the embodiments of FIGS. 2 to 8 might also be combined with those of FIGS. 14 to 15*b*, i.e. possibly with a simultaneous combination of the embodiments of FIGS. 16 to 20.

In other words, the above mentioned embodiments enable a game computer to move a passive game piece on a game board in a controlled and "free" way with reference to the position and orientation of the game piece. It is further possible to specifically exert a force on this figure wherein position, direction and strength of this moving force are controllable within certain limits within the game plan plane. Even rotating the game pieces on the spot is possible. For this purpose, two force vectors are applied to the piece which contain opposing components within the game plan plane and affect different points of the figure, as it was the case in FIGS. 4*b* and 6*b* and 12*b* and 13*b*. If n pieces are to be moved simultaneously, accordingly n times as many force vectors have to be controlled, which is basically no problem, however.

Possibly, the game pieces have slightly deviating characteristics, e.g., their friction on the game board, their weight etc. This is not problem, however, as the control means realizes a feedback mechanism which respectively considers the current position and orientation of the game pieces and if needed feeds this back to the game computer.

The above embodiments, thus, fulfill the requirements of game devices for which frequently a large amount of force vectors is needed which have to be freely controllable regarding their position, direction and strength. The above embodiments use the fact that the control of these variables does not have to be of a randomly fine resolution. Rather, quantization stages are possible which depend on the characteristics of the used game pieces, e.g., on their size. For example, if the diameter of the smallest piece used is 10 mm, it will be sufficient to be able to control the position of the force vector for example with a resolution of one/four of this diameter, i.e., for example 2.5 mm. The exact values depend on the respective implementation.

Also the strength of the force vector acting on the pieces may be determined by the control means. From the position determination means a closed loop results with the controlled variable position or speed of the object or the game piece and the regulating variables direction and strength of the "force vector". The control means may realize a PID regulator so that strength of the force vector may be adapted so that a movement as stable as possible is achieved and simultaneously side effects to other game pieces are prevented or minimized. For example, the control means may increase the force vector from a minimum value until a movement of the desired game piece occurs and may then maintain this force vector or even reduce the same due to the cancelled static friction. The quantization of the force is, for example, executed by connecting further air valves in the embodiments of FIGS. 2 to 8 or even via setting the air pressure applied to the air values. The bending waves may also be controlled with respect to their strengths. Finally, also the current through the magnetic coils in the embodiments of FIGS. 9*a* to 15*b* may be controlled.

The position determination means may be used to further check the positions of all figures which are not to be moved and if needed the control means may use suitable additional force vectors to keep those figures, which are not to be moved, stable.

In particular, the above embodiments show three different physical possibilities to generate the just-mentioned force vectors, i.e., on the one hand by bending waves in a transparent, if applicable thin plate, e.g., a perspex plate which may be lying across the game plan, such as a screen in case of the embodiments of FIGS. 16 to 25. One further possibility was the use of magnetic fields which are generated by a controllable matrix of electromagnets below the screen serving as the game plan. Finally, compressed air was also used which escapes via controllable valves, for example, in a transparent thin plate above the game plan specifically at the positions where the game piece is positioned. Apart from this, further embodiments were described which more or less used the above-described physical possibilities.

Figure 26C:
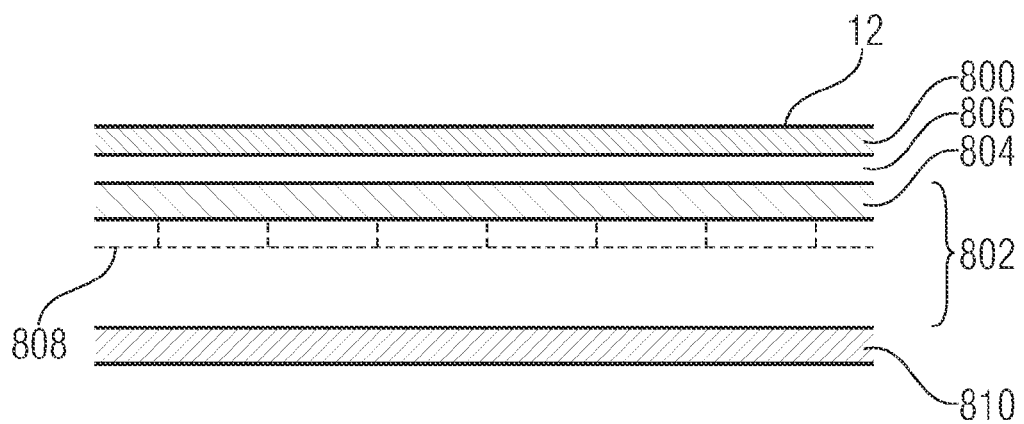
FIG. 26c shows a sectional view though a setup of a component forming the transport surface and including parts of the movement generation means and the location determination means according to a further embodiment.

Depending on the given side conditions, e.g., the type, shape and the size of the game pieces to be moved, it may be advantageous to use one or also several of the above mentioned force or power sources, i.e., bending waves, magnetic fields or compressed air for implementation, as it was indicated above. Thus, for example, by compressed air, friction below a piece or a partial area of the game plan may be specifically reduced, i.e., by the resulting air cushion effect, to then move the same through a magnetic field, wherein also FIG. 26*c* is directed to this combination.

The above embodiments may, thus, be used without further arguments in the field of games, in particular the field of board games. In particular, they may be used in computer games which enable a game computer to efficiently and automatically move physical game pieces on a game board, i.e., without the interaction of a person.

As illustrated, the above embodiments are able to be combined with a screen as a game board, wherein the computer may automatically detect the position of the game pieces even using the screen, as was described above.

The above embodiments also solve the problem frequently connected with games, i.e., that several game pieces have to be moved simultaneously. Here, the above mentioned embodiments need hardly any or no moveable parts.

With respect to the embodiments of FIGS. 14 to 15b, it is again noted that for the plate a thin plate may advantageously be used. As the surface points of the plate move in an elliptical curve, wherein the movement goes in one direction at the wave peak and in the other direction in the wave trough, it is possible through the surface wave points on the wave peak on which the object is located which is to be transported, i.e., by the fact that the object, e.g., a game piece, which is mainly in contact with points of the wave peak experiencing a frictional force into the direction in which the surface points of the wave peak move.

The control means may now control the wave forms in the plate with a sufficient accuracy so that below each game piece to be moved, wave peaks with a sufficient amplitude and suitable direction "pass", or below the pieces not to be moved, possible wave peaks remain sufficiently small. By this, the control means may specifically move desired objects or put the same into a desired position. For a rotation of an object or a game piece, the control means may, for example, generate opposed wave trains at opposing edges of the supporting surface of the object which generate forces at these opposing edges into opposing directions or engage thereto. The control means may in this respect use the wave field synthesis to generate an almost random wave field. Such a wave field synthesis is sufficiently known from the field of acoustics. Accordingly, as already described above with reference to FIGS. 18a and 18b, the transport surface may be surrounded by a large number of bending wave generation means, such as piezo elements, wherein each of the same provide a head wave or elementary wave which overlay the desired wave field according to the Huygens' principle.

It may be advantageous when the bending wave generation means do not exceed a certain minimum distance to each other. This minimum distance may depend on the frequency with which the bending wave generation means generate the bending waves. The control means 18 may, thus, use the fact that the wave field synthesis principle also works in solid bodies and the ultrasonic range. The bending waves may, for example, comprise wave lengths smaller than the dimensions of the game pieces or the object to be transported. For example, sound sources like the above mentioned piezo elements generate a suitable wave field with wave trains of a sufficiently high frequency in the thin plate, wherein the sound sources are arranged, for example, along the edge of the plate in a suitably small distance to each other. As explained above, here the plate may advantageously be terminated with an acoustic characteristic impedance to limit undesired reflections at the edge. Depending on the application, also less bending wave generation means with a larger distance to each other may be sufficient. In other words, depending on the application, a wave field may also be sufficient which was generated with a reduced number of elementary waves or less bending wave generation means.

FIG. 26c also showed that it is possible, below a display or a thin flat panel display as a game plan, to provide a matrix of individually controllable small coils whose alignment is vertical to the game plan. In this way, by a suitable control of these magnetic coils, a controllable magnetic field may be generated in the plane of the game plan. The latter may be used "quasi-statically" or, according to the principles of the linear motor, also for moving the game pieces, wherein the latter was an embodiment for this in FIG. 10c. The game piece of FIG. 26b may, for example, be used in this respect if it comprises a magnetically attracting or repelling element according to one of FIGS. 10a to 10c.

With the quasi-statical solution in the game pieces, for example, small permanent magnets are located and the magnetic coils below the game board are simply used to exert tensile or shear forces onto these permanent magnets. By this, the desired force vectors result and with a sufficiently fine raster of the magnetic coils and a suitable control of the coils, in connection with the above-described feedback by the position determination means, the desired movement of the pieces may be achieved. If even two or more permanent magnets are accommodated in the game piece, then as was illustrated above with reference to FIGS. 12a to 13b, one may be provided in one side and one in the opposing side of the game floor whereby the piece may easily be rotated or turned when on both sides magnetic fields pull or push in the corresponding direction. With a suitable setup of the game piece, the shear effects may also be used, for example to reduce the weight of the piece weighing on the support or base and to, thus facilitate shifting or pulling the piece by a magnet attached below the center of gravity of the piece.

With the linear motor solution according to FIG. 10c, small magnetic coils are located in the game pieces which serve as "rotor coils", wherein current may be induced by magnetic field changes. The magnetic coils below the game board are the field coils or excitation coils which generate the moved magnetic field exerting the forces on the rotor coils. With a suitable implementation of the excitation coils, e.g., a suitable distance to the rotor windings and "resolution" of the excitation coil matrix, the forces on the individual rotor coils may be directly decoupled from each other sufficiently to execute the desired individual movements of the game pieces. Another implementation possibility is to make the rotor coils 110 in the game pieces "switchable" and, thus, make the rotor coils individually activable, by, for example, a switch or a controllable resistance being connected into the branch in parallel to the actual coil 110. The moving magnetic field may then be more spacious which possibly facilitates the setup of the excitation matrix or the magnetic field coil matrix. By the selection of the desired rotor coils, desired pieces may be moved and rotated.

The game pieces or the object to be moved may possibly be instructed individually from the outside, e.g., by the control means, to open or close the corresponding switching elements or rotor coils.

The above embodiments of FIGS. 2 to 8 were directed to a principle according to which an object "hovers" on an air cushion. The air for the air cushion comes from many fine holes or air nozzles of a base plate, for example. As described above, it may be implemented as a transparent plate which is arranged above a game board, e.g., a display. On the plate, thus, the desired object, e.g., a game piece may hover. The air cushion below the game piece cancels the friction between the piece and the ground or floor plate, so that it may easily be moved in one direction.

As described above, it is possible to combine the air cushion effect for friction reduction in connection with the other physical possibilities of movement or described forces for movement. However, it is also possible to generate the forces of movement with the help of air nozzles in the ground plate if the same may be individually opened and closed and the bottom sides of the game pieces are suitably shaped as described above with reference to FIGS. 2 to 8.

It is to be noted with respect to the transparent plate which was mentioned several times above, having individually controllable air valves, that the same may be a thin electrically non-conducting plastics plate. For manufacturing the individually controllable air valves, for example with a laser, very fine short slots are cut into the non-conducting plastics plate which may serve as valves. Via electrostatic forces, these slots may be held open or pulled closed. In this respect the slots as described above may be coated with a transparent conductive material and at a later time may be provided with a non-conductive transparent cover layer. The sides of the slots, thus, virtually form a "plate capacitor". In further steps, on the top and bottom side of the ground plate of a suitable transparent material, a matrix of conductive traces and transistors may be applied so that each of the sides of the slots may be individually addressed and charged.

If the sides of the slots are now provided with charge of the same polarity, they repel and keep the air valve open, whereas when they are provided with charge of a different polarity, they attract and keep the valve closed, as it was described above. If applicable, it is advantageous when the plate in this respect comprises a sufficient flexibility.

According to an alternative embodiment, two foils lying above each other are used to form electrostatic valves.

The ground plate of the game pieces may be implemented so that by means of the controllable air valves suitable forces of movement may be exerted on the figures which shift the same laterally. One possible design is, as described above, that the ground plate of the piece is divided into separate areas which are separated from each other by small edges. Via the air valves, the elements may be provided with air separately. In the center of the figure, an element may be attached whose the border is closed and which forms a carrying air cushion. Around those elements, further elements may be arranged whose the border is not completely closed. At the opening of the border, a "thrust nozzle" results which, depending on the shape, may generate a thrust along or transverse to the piece if the element is provided with air. In this respect, reference is again made to the description of FIGS. 3, 4a and 4b. For moving the piece, the central element may be provided with air to activate the carrying air cushion and, thus, achieve a reduction of friction and one or several further elements may be provided with air, whereby a desired force of movement in a certain direction or a certain rotational movement is generated.

Due to the above embodiments, it is, thus, not necessary to use a robot grip arm to move objects on a surface. Active movement elements at the game pieces are not necessary. The force vectors are rather generated without moving parts, except in the above embodiments for electrostatic air valves or piezo elements for the bending wave generation. Several pieces may be simultaneously rotated or moved by the above embodiments. The force vector generation may exclusively take place "from the bottom". The space above the game plan or above the transport surface may, thus, be kept clear. In particular, the above embodiments enable a "touchable" game board interface for a game computer. The computer may detect the moves of a person and it may execute its moves or moves of persons in other places directly with the physical game pieces. A game arrangement is suitable for "any" games using a game plan and game pieces.

It is to be noted with respect to the above-mentioned individually controllable air valves, that the used material, e.g., silicon, advantageously should have a sufficient flexibility to efficiently open and close the air gap. As mentioned above, as an exerting force an electrostatic force may be used due to electric fields. Thus, the resulting capacitor plates may be formed transparently. Depending on the application, it may be sufficient to make only one electrode or one plate of the capacitor plates of each individually controllable valve controllable if, for example, as another plate of the capacitor plates or as another electrode a zone with a permanent charge in the area or on the one side of the slot of the individually controllable air valve is introduced. As already mentioned above, the silicon air valves may be seated in a stable carrier plate, for example made of glass, which has holes of the size of the valves. The refractive index of the silicon valves and the glass may be selected so that it is identical, e.g., 1.43. It may, thus, be guaranteed that there are no points of discontinuity at the transitions of the glass plate to the silicon valves so that transparency is not interfered with.

With respect to the embodiment according to FIGS. 14 to 15b, it is noted that for a movement effect, the generation of a standing wave may also be used. The control means may control the moving means 16 so that with a suitable shape of the bottom side of the object or the game piece to be moved, the object or the game piece is positioned in the "troughs" of the standing wave. If the standing wave is then slowly moved, e.g., by a slow adjustment of the phase of one of the generating wave trains, the game piece would be drawn along by the wave peaks. If at the game piece separate zones with corresponding shapes are located, the piece may also be rotated by two different standing waves.

Depending on the circumstances, the above-described methods may be implemented in hardware or in software, e.g. methods for the localization and identification of objects on a display or methods for moving objects on a surface. The implementation may be on a digital storage medium, in particular a floppy disc, a CD or DVD having electronically readable control signals which may cooperate with a programmable computer system so that the respective method is executed. In general, the invention thus also consists in a software program product or a computer product or a program product having a program code stored on a machine readable carrier for executing the inventive method when the software program product is executed on a computer or on a processor. In other words, the invention may thus be realized as a computer program or software program or program having a program code for executing the method when the program is executed on a processor. The processor may here be formed by a computer, a chip card, a game computer or another integrated circuitry.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A system for moving an object which may be magnetically attracted or repelled across a surface, comprising a plurality of magnetic coils distributed along the surface controllable separately from each other in order to generate magnetic dipoles with an alignment perpendicular to the surface;

a first controller that controls the plurality of magnetic coils distributed along the surface in order to approximate the object to a desired position on the surface;

a determiner that determines a position of the object on the surface including:

a display, wherein in a direction of view, the surface is in front of the display and the display is between the surface and the plurality of magnetic coils distributed along the surface, and the display is visible through the surface by a viewer;

a second controller that controls the display such that the display indicates laterally varying information;

an optical sensor accommodated in or at the object and that optically scans a supporting surface on which a level bottom of the object is supported in order to acquire a scan result with respect to the laterally varying information; and a secondary determiner that determines the position of the object depending on the scan result.

2. A system according to claim 1, wherein the object is formed from a magnetically permeable material and the object comprises two elements which may be magnetically attracted or repelled offset laterally to a supporting surface of the object.

3. The system according to claim 1, further comprising a nozzle plate forming the surface and comprising a plurality of nozzles in the surface through which compressed air may be guided to form an air cushion between the object and the surface.

4. A method for moving an object which may be magnetically attracted or repelled across a surface by means of a plurality of magnetic coils distributed along the surface which may be controlled separately from each other in order to generate magnetic dipoles with an alignment perpendicular to the surface, the method comprising:

determining a position of the object on the surface; and controlling the plurality of magnetic coils distributed along the surface in order to approximate the object to a desired position on the surface;

wherein the determining a position of the object on the surface comprises:

controlling a display such that the display indicates laterally varying information, wherein in a direction of view, the surface is in front of the display and the display is between the surface and the plurality of magnetic coils distributed along the surface, the display is visible through the surface by a viewer;

optically scanning, by an optical sensor accommodated in or at the object, a supporting surface on which a level bottom of the object is supported in order to acquire a scan result with respect to the laterally varying information; and determining the position of the object depending on the scan result.

5. A non-transitory computer readable medium including a computer program comprising a program code for executing, when the computer program is executed on a computer, a method for moving an object which may be magnetically attracted or repelled across a surface by means of a plurality of magnetic coils distributed along the surface which may be controlled separately from each other in order to generate magnetic dipoles with an alignment perpendicular to the surface, the method comprising:

determining a position of the object on the surface; and controlling the plurality of magnetic coils distributed along the surface in order to approximate the object to a desired position on the surface;

wherein the determining a position of the object on the surface comprises:

controlling a display such that the display indicates laterally varying information, wherein in a direction of view the surface is in front of the display and the display is between the surface and the plurality of magnetic coils distributed along the surface, and the display is visible through the surface by a viewer;

optically scanning, by an optical sensor accommodated in or at the object, a supporting surface on which a level bottom of the object is supported in order to acquire a scan result with respect to the laterally varying information; and determining the position of the object depending on the scan result.

6. The system according to claim 1, wherein the first controller shifts the object via a distance greater than an inter-coil distance of the plurality of magnetic coils by selectively activating the plurality of magnetic coils so that a location in which activated ones of the plurality of magnetic coils are located, hurries behind the position of the object, thereby pushing ahead the object.

7. The method according to claim 4, wherein the controlling includes shifting the object via a distance greater than an inter-coil distance of the plurality of magnetic coils by selectively activating the plurality of magnetic coils so that a location in which activated ones of the plurality of magnetic coils are located, hurries behind the position of the object, thereby pushing ahead the object.

* * * * *